(12) United States Patent
Hirayama

(10) Patent No.: US 11,582,354 B2
(45) Date of Patent: Feb. 14, 2023

(54) IMAGE READING AND CONTROL DEVICE, AND METHOD, FOR DOCUMENT REGION EXTRACTION BASED ON EDGE CANDIDATE AND DIRT POSITION

(71) Applicant: Seiko Epson Corporation, Tokyo (JP)

(72) Inventor: Ryoichi Hirayama, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/650,949

(22) Filed: Feb. 14, 2022

(65) Prior Publication Data

US 2022/0263949 A1 Aug. 18, 2022

(30) Foreign Application Priority Data

Feb. 16, 2021 (JP) .............................. JP2021-022335

(51) Int. Cl.
| | |
|---|---|
| *H04N 1/00* | (2006.01) |
| *H04N 1/409* | (2006.01) |
| *H04N 1/38* | (2006.01) |
| *H04N 1/387* | (2006.01) |

(52) U.S. Cl.
CPC ..... *H04N 1/00018* (2013.01); *H04N 1/00037* (2013.01); *H04N 1/00092* (2013.01); *H04N 1/00748* (2013.01); *H04N 1/00769* (2013.01); *H04N 1/38* (2013.01); *H04N 1/3873* (2013.01); *H04N 1/4097* (2013.01)

(58) Field of Classification Search
None
See application file for complete search history.

(56) References Cited

U.S. PATENT DOCUMENTS

| | | | | |
|---|---|---|---|---|
| 6,621,599 | B1 * | 9/2003 | Newell ............... | H04N 1/00681 399/376 |
| 8,018,629 | B2 * | 9/2011 | Watanabe ........... | H04N 1/00726 358/475 |
| 10,021,272 | B2 * | 7/2018 | Namiki .............. | H04N 1/00084 |
| 10,491,770 | B2 * | 11/2019 | Ishido ................. | H04N 1/00718 |
| 11,140,295 | B2 * | 10/2021 | Morikawa ........... | H04N 1/00785 |
| 11,240,393 | B2 * | 2/2022 | Horiguchi ........... | H04N 1/00689 |
| 2018/0295256 | A1 * | 10/2018 | Yasaki ................. | H04N 1/193 |
| 2020/0036850 | A1 | 1/2020 | Hirayama et al. | |

FOREIGN PATENT DOCUMENTS

| | | | | |
|---|---|---|---|---|
| JP | 2020-017856 | | 1/2020 | |
| JP | 2020150292 A | * | 9/2020 | ........... G06K 9/6202 |

* cited by examiner

*Primary Examiner* — Scott A Rogers
(74) *Attorney, Agent, or Firm* — Workman Nydegger

(57) ABSTRACT

A controller of an image reading device performs search for an edge candidate position inward from an edge portion in a main scanning direction of analysis image data in an extraction process of extracting a document region from read image data. When the retrieved edge candidate position corresponds to a dirt position, the search is continued whereas when the retrieved edge candidate position does not correspond to the dirt position, the document region is extracted from the read image data at the retrieved edge candidate position.

11 Claims, 14 Drawing Sheets

IMAGE READING AND CONTROL DEVICE, AND METHOD, FOR DOCUMENT REGION EXTRACTION BASED ON EDGE CANDIDATE AND DIRT POSITION

The present application is based on, and claims priority from JP Application Serial Number 2021-022335, filed Feb. 16, 2021, the disclosure of which is hereby incorporated by reference herein in its entirety.

BACKGROUND

1. Technical Field

The present disclosure relates to an image reading device that reads a document, an image reading system, a control device, and a document region extraction method.

2. Related Art

As an image reading device, an image sensor represented by a contact image sensor method, that is, a CIS method, and a method of charge coupled devices abbreviated as CCD is used. When dirt adheres to a document reading surface of an image sensor, an error occurs in a result of reading. Examples of the dirt include scratches and adhering substances, such as fingerprints, paper dust, pencil dust, correction fluid, glue, and condensation. When a document is moved in a relative movement direction while the image sensor is not moved, the dirt described above appears as a vertical line in the relative movement direction as a result of reading. JP-A-2020-17856 discloses an image reading device that generates an alert when detecting dirt on a document reading surface.

When the image reading device performs a document region extraction process of removing a background region out of a document region from read image data and a position of the dirt on the document reading surface is out of the document region, the image reading device extracts the document region including the dirt position.

SUMMARY

According to an aspect of the present disclosure, an image reading device includes a reading section configured to read a document and output a result of the reading performed on the document, a driving section configured to relatively move the document and the reading section in a relative movement direction, a storage section configured to store read image data based on the reading result and analysis image data that is based on the reading result and that is used to discriminate a document region from a background region out of the document region, and a controller configured to perform a dirt detection process of detecting a dirt position of the reading section in a pixel column direction intersecting with the relative movement direction and an extraction process of extracting the document region from the read image data based on the analysis image data. In the extraction process, the controller searches the analysis image data for an edge candidate position where the background region changes to the document region inward from an edge portion in the pixel column direction, and continues the search when the retrieved edge candidate position corresponds to the dirt position and extracts the document region from the read image data at the retrieved edge candidate position when the retrieved edge candidate position does not correspond to the dirt position.

According to another aspect of the present disclosure, an image reading system includes the image reading device and a control device. The image reading device further includes a transmission section that transmits output image data corresponding to the document region extracted from the read image data and the dirt position to the control device. The control device includes a reception section configured to receive the output image data and the dirt position, and an image processor configured to reduce a line extending in the relative movement direction in the output image data based on the dirt position.

According to a further aspect of the present disclosure, a control device is coupled to an image reading device. The image reading device relatively moves a document and a reading section that reads the document in a relative movement direction and transmits, to the control device, output image data based on a result of the reading performed on the document and a dirt position of the reading section in a pixel column direction intersecting with the relative movement direction. The control device includes a reception section configured to receive the output image data and the dirt position, and an image processor configured to reduce a line extending in the relative movement direction in the output image data based on the dirt position.

According to a still further aspect of the present disclosure, a document region extraction method is employed in an image reading device including a reading section configured to read a document and output a result of the reading performed on the document, a driving section configured to relatively move the document and the reading section in a relative movement direction, and a storage section configured to store read image data based on the reading result and analysis image data that is based on the reading result and that is used to discriminate a document region from a background region out of the document region. The document region extraction method includes a dirt detection step of detecting a dirt position of the reading section in a pixel column direction that intersects with the relative movement direction, and an extraction step of extracting the document region from the read image data based on the analysis image data. In the extraction step, the analysis image data is searched for an edge candidate position where the background region changes to the document region inward from an edge portion in the pixel column direction, the search is continued when the retrieved edge candidate position corresponds to the dirt position, and the document region is extracted from the read image data at the retrieved edge candidate position when the retrieved edge candidate position does not correspond to the dirt position.

DESCRIPTION OF EXEMPLARY EMBODIMENTS

Figure 1:
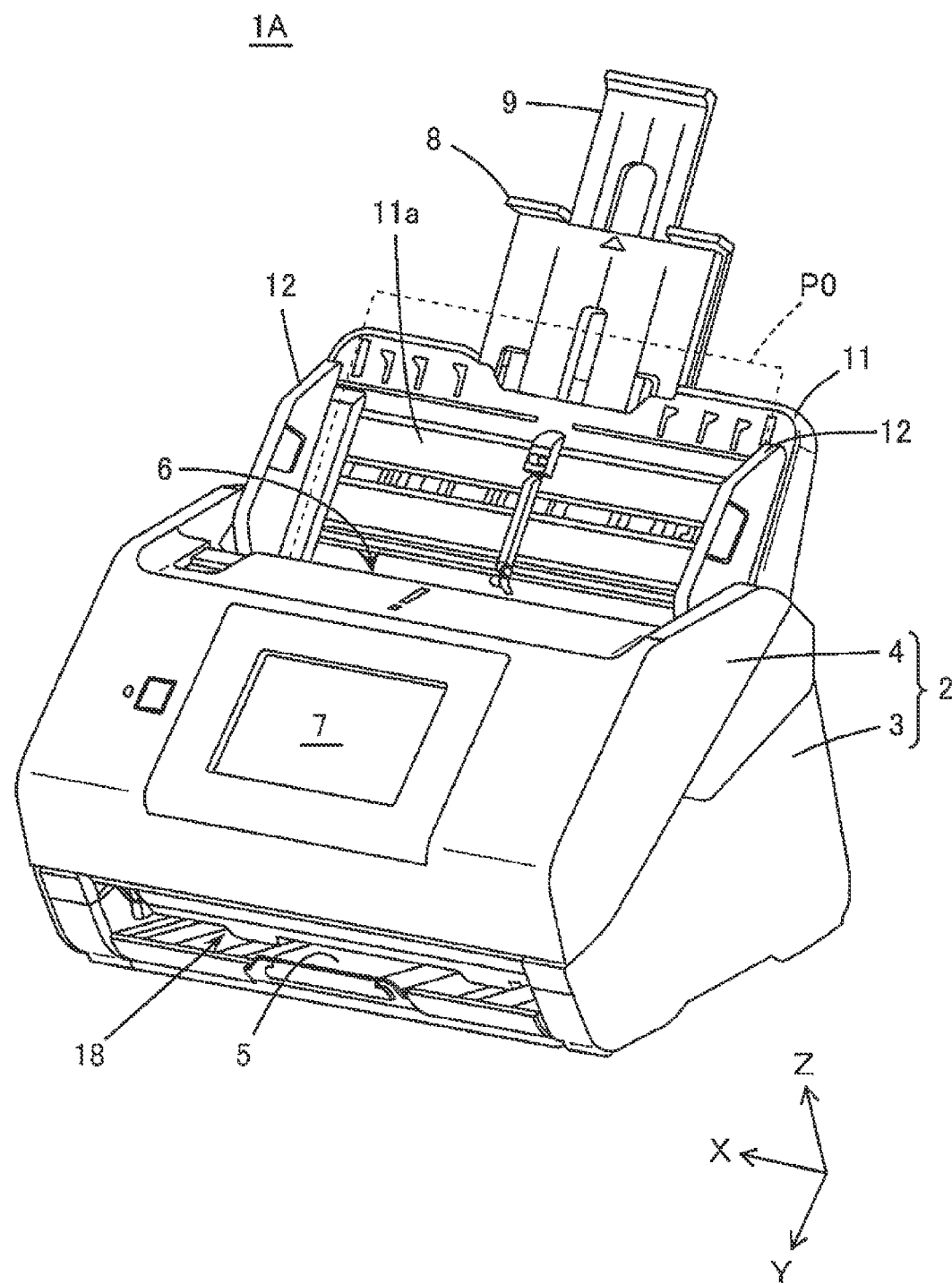
FIG. 1 is a perspective view schematically illustrating an example of appearance of an image reading device.

Hereinafter, an embodiment of the present disclosure will be described. The embodiment below is merely an example of the present disclosure, and it is not necessarily the case that all features of this embodiment are requirements for the solving means of the present disclosure.

1. OUTLINE OF TECHNIQUE OF PRESENT DISCLOSURE

First, an outline of a technique included in the present disclosure will be described with reference to examples illustrated in FIGS. 1 to 15. Note that the drawings in this application schematically illustrate examples, and therefore, magnification factors in individual directions in the drawings may vary and the drawings may not be consistent. Components of this technique are obviously not limited to concrete examples denoted by reference numerals. In "Outline of Technique of Present Disclosure", text in brackets means supplemental description of a preceding word.

First Mode

Figure 6:
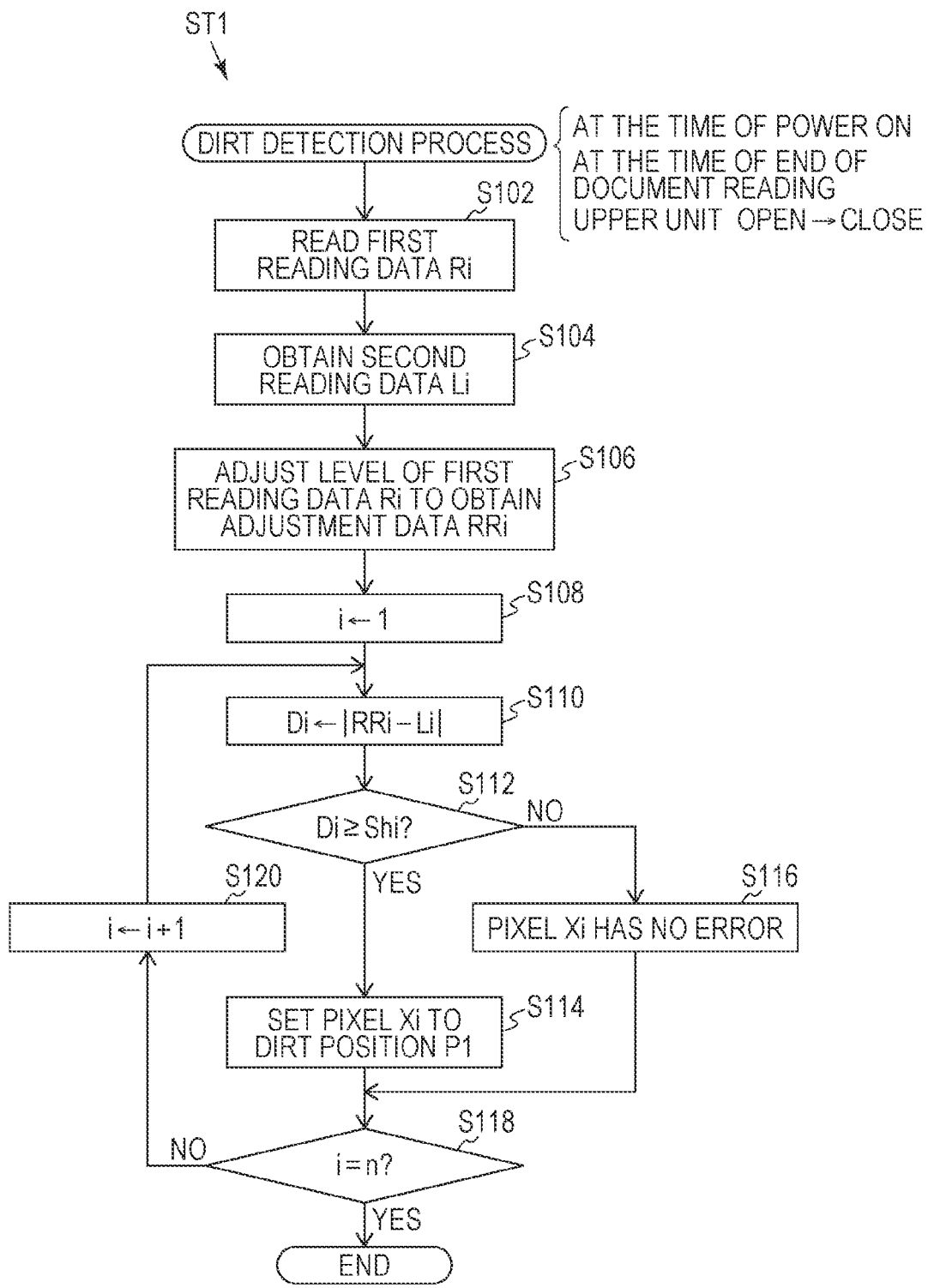
FIG. 6 is a flowchart schematically illustrating an example of a dirt detection process.
Figure 11:
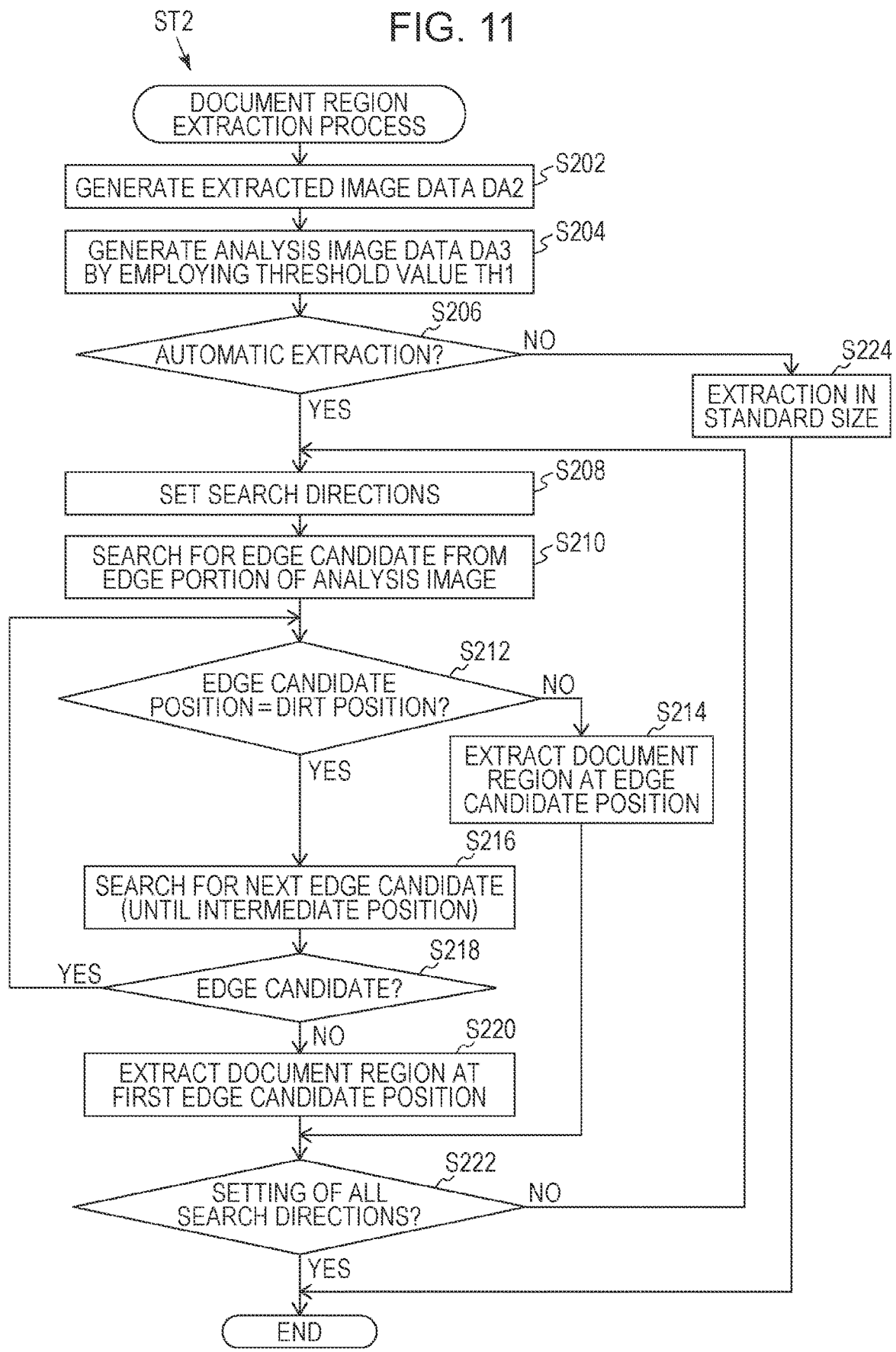
FIG. 11 is a flowchart schematically illustrating an example of the document region extraction process.

As illustrated in FIGS. 1, 2, 3, and 7, the image reading device (such as a scanner LA) according to a mode of the present technique includes a reading section 20, a driving section UD, a memory (such as a random access memory (RAM) 38), and a controller 40. The reading section 20 reads a document P0 and outputs a result RS of the reading performed on the document P0. The driving section UD relatively moves the document P0 and the reading section 20 in a relative movement direction D1. The memory (38) stores read image data DA1 based on the reading result RS and analysis image data DA3 that is based on the reading result RS and that is used to discriminate a document region A1 from a background region A2 out of the document region A1. As illustrated in FIGS. 6 and 11, the controller 40 performs a dirt detection process of detecting a dirt position P1 of the reading section 20 in a pixel column direction D2 that intersects with the relative movement direction D1 and an extraction process of extracting the document region A1 from the read image data DA1 based on the analysis image data DA3.

In the extraction process, the controller 40 searches the analysis image data DA3 for an edge candidate position P2 where the background region A2 changes to the document region A1 inward from an edge portion (for example, a left side DA1c or a right side DA1d) in the pixel column direction D2, continues the search when the retrieved edge candidate position P2 corresponds to the dirt position P1, and extracts the document region A1 from the read image data DA1 in the retrieved edge candidate position P2 when the retrieved edge candidate position P2 does not correspond to the dirt position P1.

According to the first mode, it is not necessarily the case that, when a position of dirt including an adhering substance, such as dust, and a scratch is out of an actual document portion in the reading section 20, the position corresponds to an extraction position of the document portion. When the dirt position P1 is included in the actual document portion, the actual document portion corresponds to an extraction position. Accordingly, the mode provides an image reading device capable of performing the document region extraction process, while adverse effect of dirt is diminished, even when the reading section has dirt including an adhering substance, such as dust, and a scratch.

Here, examples of the image reading device include a scanner, a facsimile, and a multifunction peripheral having a document reading function and an image data output function.

The relative movement of the document and the reading section includes a movement of the document while the reading section is not moved, a movement of the reading section while the document is not moved, and a movement of both the document and the reading section.

Note that the description above is also applied to modes below.

Second Mode

Figure 7:
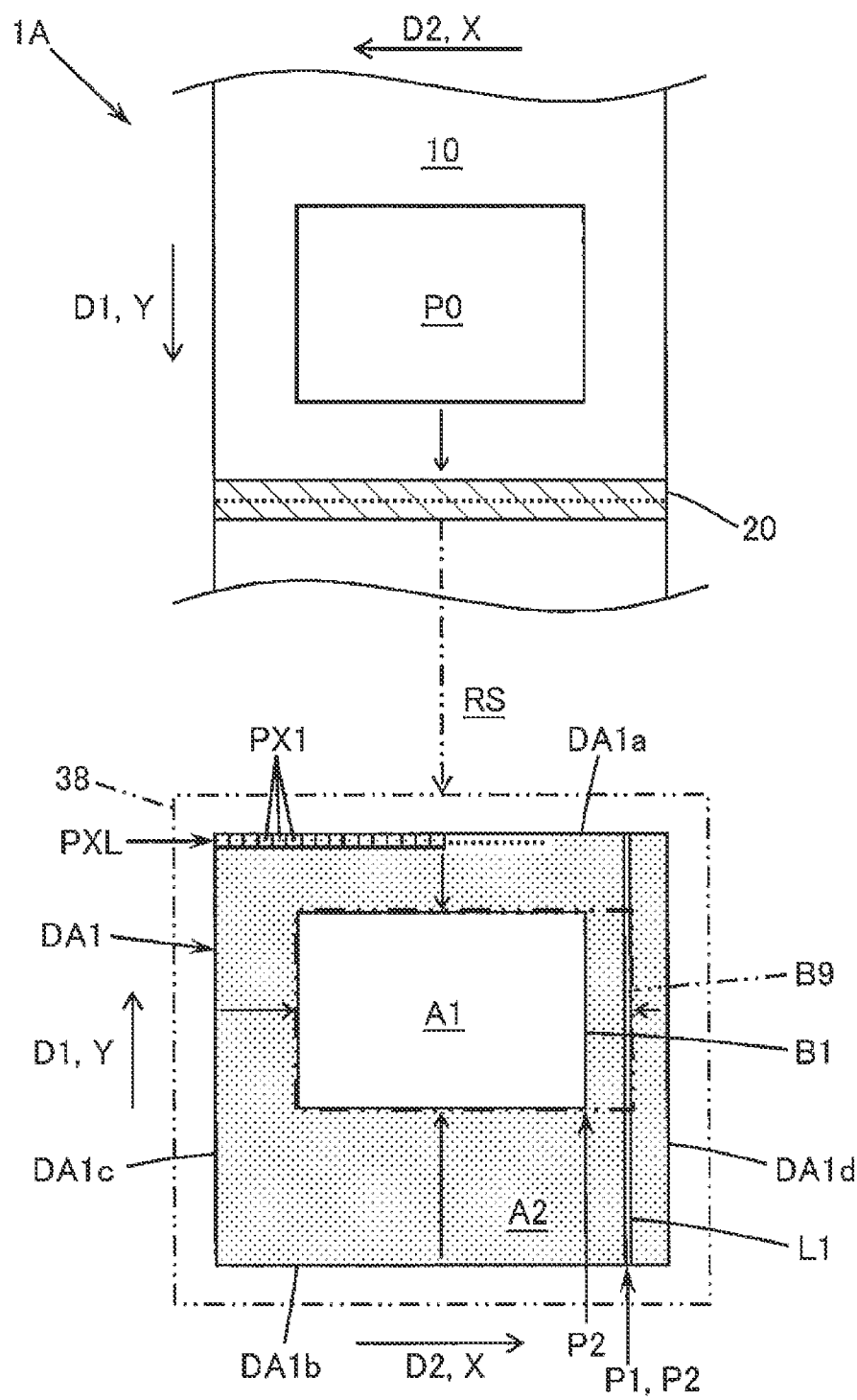
FIG. 7 is a diagram schematically illustrating a state in which the reading section reads a document.

As illustrated in FIGS. 6 and 7, the controller 40 may search the analysis image data DA3, in the extraction process, for the edge candidate position P2 inward from opposite edge portions (for example, the left side DA1c and the right side DA1d) in the pixel column direction D2. In this way, the document region extraction process is performed on the both sides in the pixel column direction D2 while adverse effect of the dirt is diminished. Accordingly, this mode provides a preferred image reading device that performs the document region extraction process while adverse effect of dirt is diminished.

Note that, although not included in the second mode, an example in which the edge candidate position P2 is searched for from one of the edge portions in the pixel column direction D2 and not searched for from the other of the edge portions is also included in this technique.

Third Mode

Figure 3:
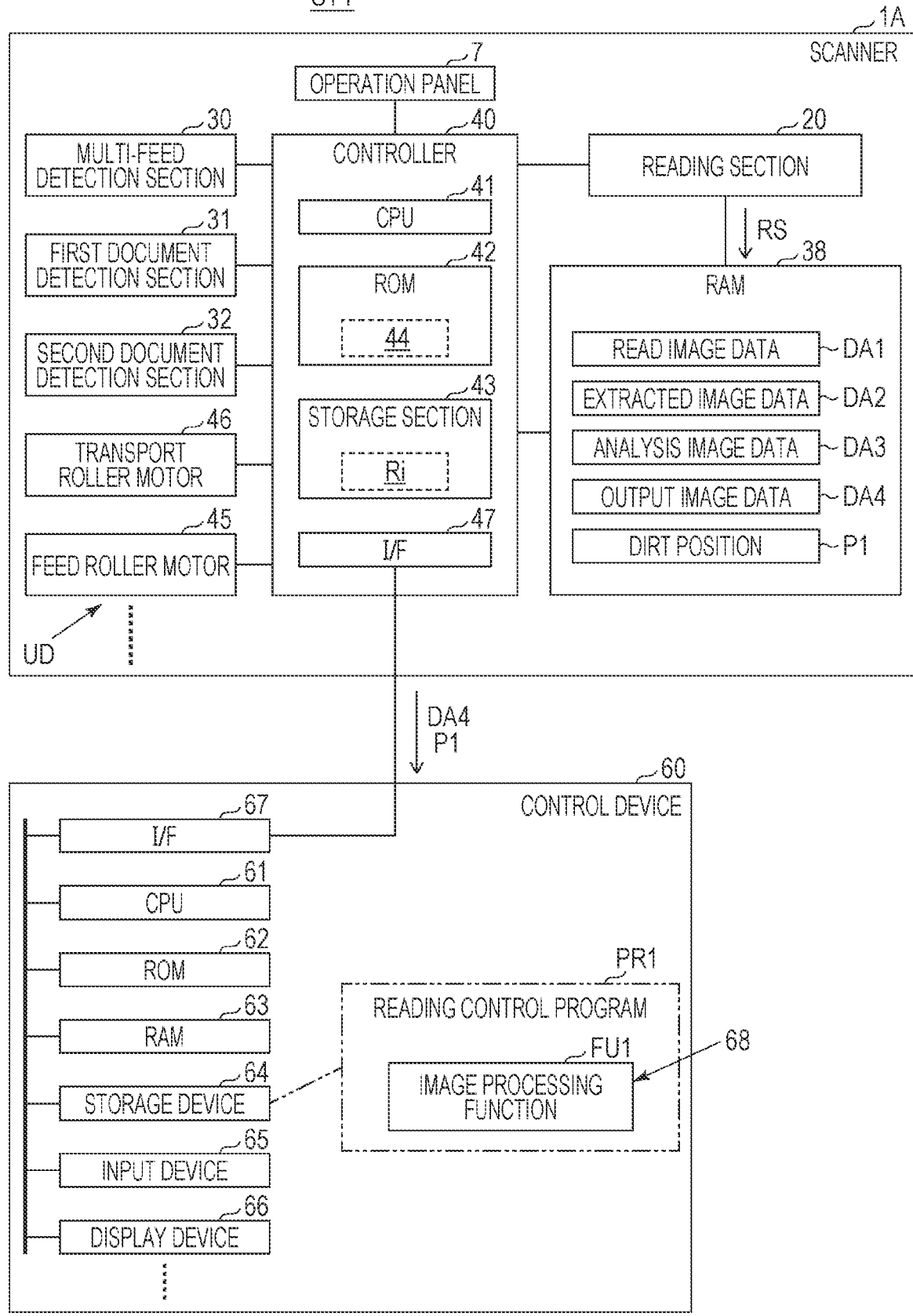
FIG. 3 is a block diagram schematically illustrating an example of a configuration of an image reading system.
Figure 4:
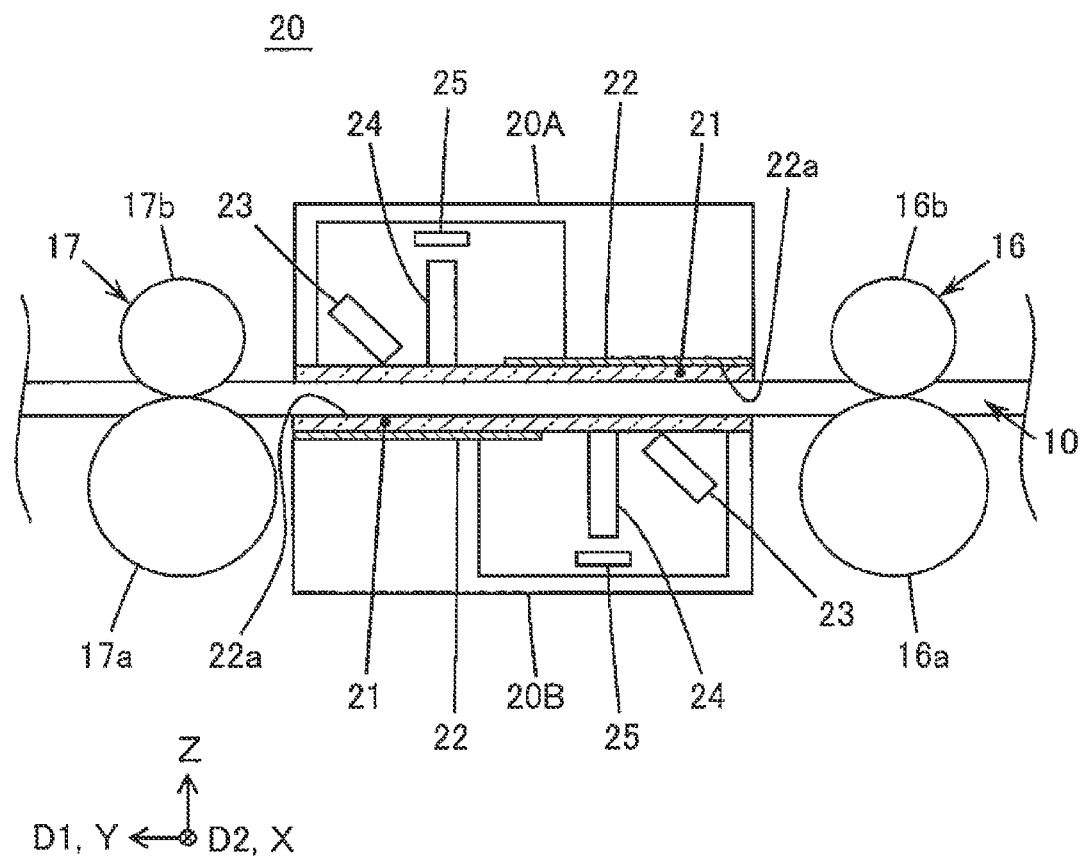
FIG. 4 is a diagram schematically illustrating an example of a configuration of a reading section.

As illustrated in FIG. 4, the reading section 20 may include a reading reference surface 22a. As illustrated in FIG. 3, the image reading device (1A) may further include a storage section 43 storing first reading data Ri of the reading reference surface 22a. As illustrated in FIG. 6, in the dirt detection process, the controller 40 may obtain second reading data Li of the reading reference surface 22a after the first reading data Ri is stored and detect the dirt position P1 based on the second reading data Li and the first reading data Ri. By this, the adverse effect of the dirt generated in the reading section 20 due to use of the image reading device (1A) is diminished. Accordingly, this mode provides a preferred image reading device that performs the document region extraction process while adverse effect of dirt is diminished.

Fourth Mode

Figure 9:
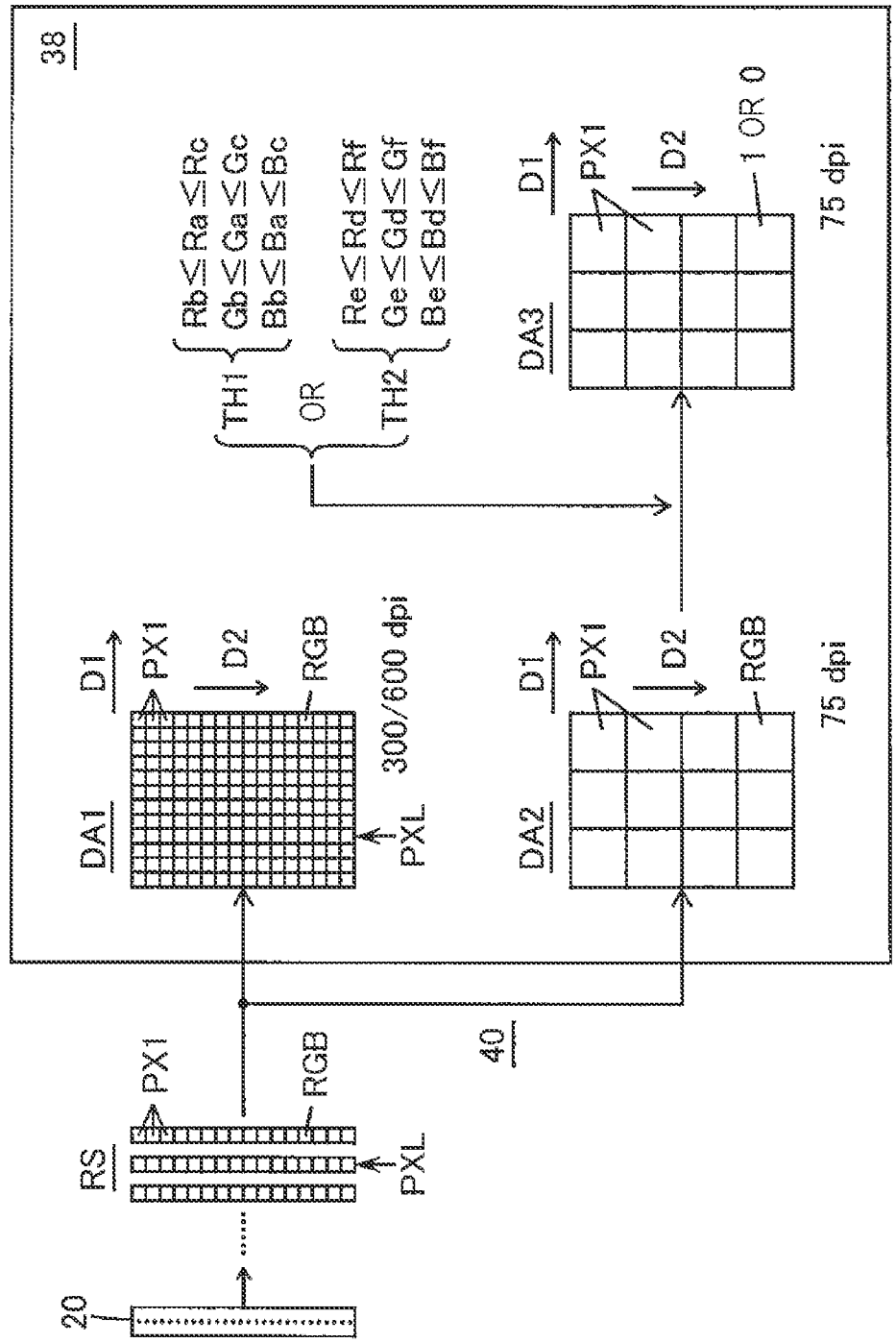
FIG. 9 is a diagram schematically illustrating an example of generation of read image data and analysis image data using a reading result.

The background region A2 may have a color within a first setting range based on a color of the reading reference surface 22a. In FIG. 9, as an example of the first setting range, "Rb≤Ra≤Rc", "Gb≤Ga≤Gc", and "Bb≤Ba≤Bc" are illustrated. As illustrated in FIGS. 9 and 11, the controller 40 may generate the analysis image data DA3 based on a first threshold value TH1 for discriminating a color of the document region A1 from a color of the background region A2 and the reading result RS. This mode provides a further preferred image reading device that performs the document region extraction process while adverse effect of dirt is diminished.

Fifth Mode

The background region A2 may have a color within a second setting range based on a color of a portion of a carrier sheet SH1 (refer to FIG. 12) overlapping with the reading reference surface 22a. The carrier sheet SH1 holds the document P0. In FIG. 9, as an example of the second setting range, "Re≤Rd≤Rf", "Ge≤Gd≤Gf", and "Be≤Bd≤Bf" are illustrated. As illustrated in FIGS. 9, 11, and 13, the controller 40 may generate the analysis image data DA3 based on a second threshold value TH2 for discriminating a color of the document region A1 from a color of the background region A2 and the reading result RS. This mode also provides a further preferred image reading device that performs the document region extraction process while adverse effect of dirt is diminished.

Sixth Mode

Figure 2:
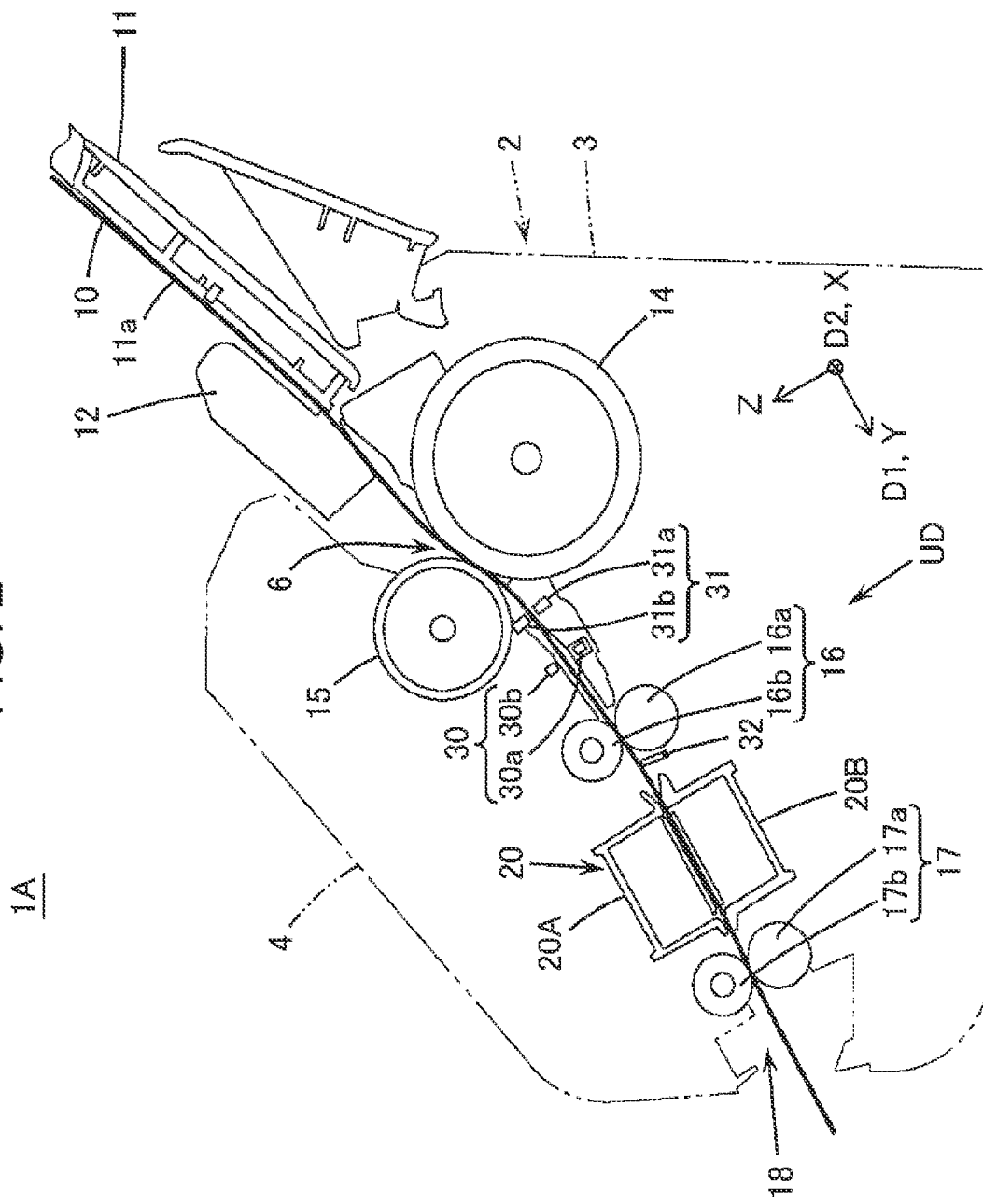
FIG. 2 is a vertical cross-sectional view schematically illustrating an example of a document transport path of the image reading device.

As illustrated in FIGS. 1 and 2, the image reading device (1A) may further include a cover portion (for example, an upper unit 4) that closes and opens the transport path 10 of the document P0. As illustrated in FIG. 6, the controller 40 may perform the dirt detection process on at least one of a timing when the image reading device (1A) is turned on, a timing when the reading performed on the document P0 is terminated, and a timing when the cover portion (4) is closed. By this, the adverse effect of the dirt detected at least one of the timing when the image reading device (1A) is turned on, the timing when the reading on the document P0 is terminated, and the timing when the cover portion (4) is closed is diminished. Accordingly, this mode provides a preferred image reading device that performs the document region extraction process while adverse effect of dirt is diminished.

Seventh Mode

As illustrated in FIG. 9, the memory (38) may store the analysis image data DA3 having resolution smaller than that of the read image data DA1. According to this mode, a data amount of the memory (38) may be reduced and the process of generating the analysis image data DA3 and the document region extraction process may be performed at higher speed.

Note that, although not included in the seventh mode, an example in which resolution of the analysis image data DA3 is the same as that of the read image data DA1 is also included in this technique.

Eighth Mode

As illustrated in FIG. 11, when the edge candidate position P2 corresponding to the dirt position P1 is retrieved in the extraction process and thereafter the edge candidate position P2 is not further retrieved until an intermediate portion of the analysis image data DA3 in the pixel column direction D2, the controller 40 may extract the document region A1 from the read image data DA1 in the retrieved edge candidate position P2. In this case, the dirt position P1 overlaps with an edge of the document region A1 in the pixel column direction D2, and therefore, lack of the actual document region A1 at the edge in the pixel column direction D2 may be avoided since the document region A1 is extracted from the read image data DA1 at the retrieved edge candidate position P2. Accordingly, this mode provides an image reading device capable of more appropriately performing the document region extraction process.

Ninth Mode

Figure 14:
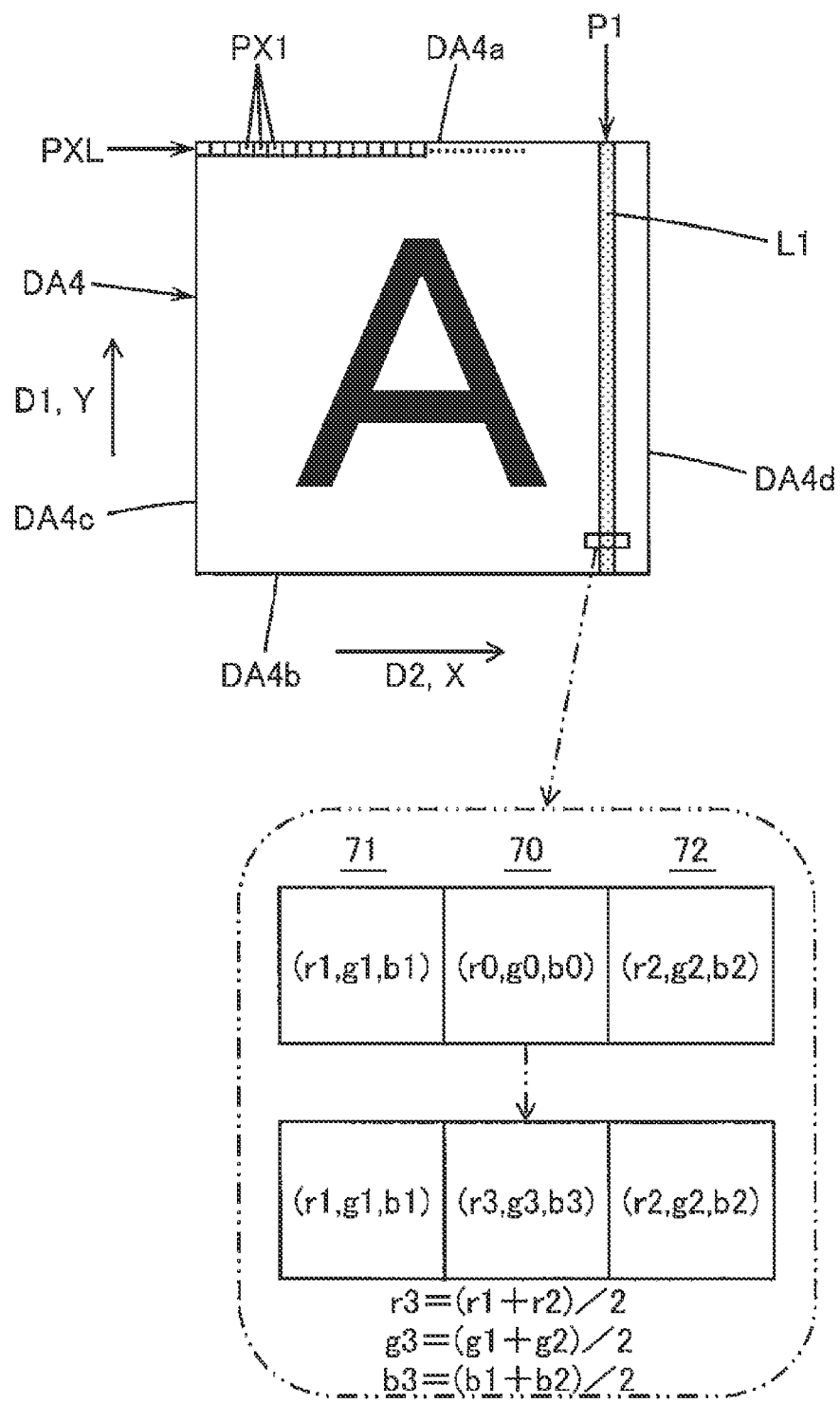
FIG. 14 is a diagram schematically illustrating an example of a process of diminishing a line in output image data by performing image processing.
Figure 15:
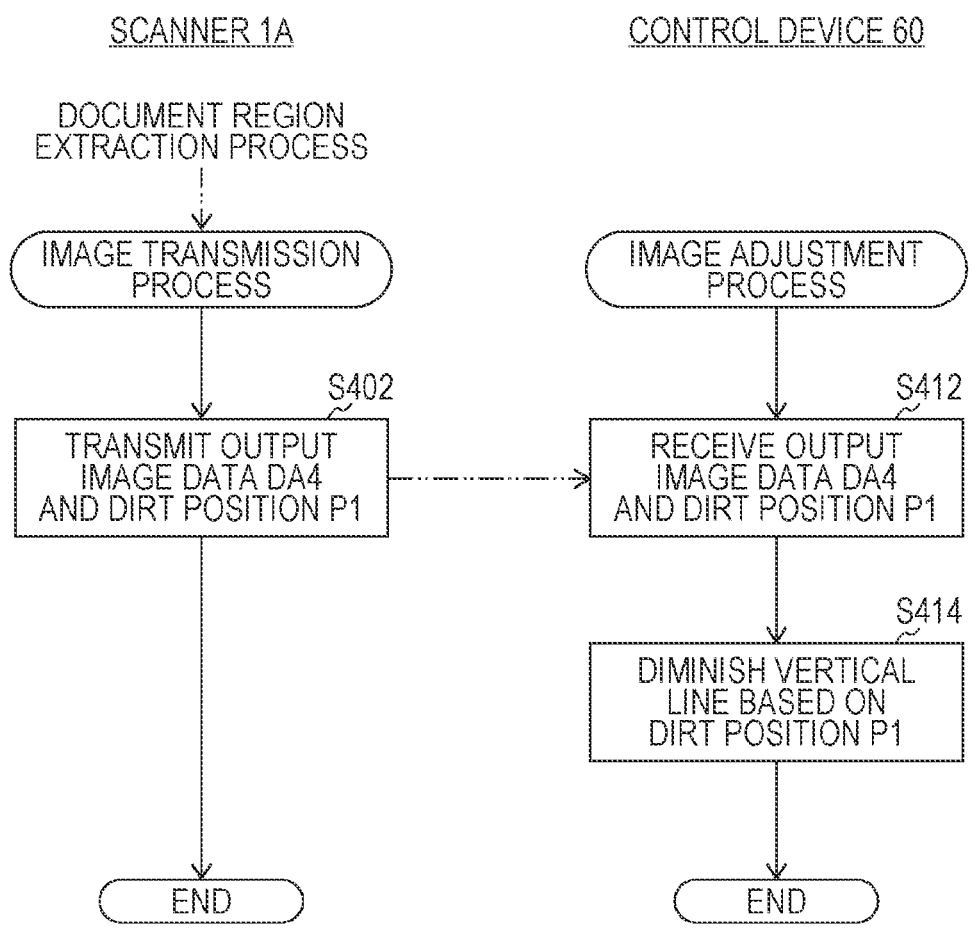
FIG. 15 is a flowchart schematically illustrating an example of a process of diminishing a line included in the output image data.

Furthermore, as illustrated in FIGS. 3, 14, and 15, the image reading system SY1 according to a mode of this technique includes at least one of the image reading devices (1A) of the first to eighth modes and a control device 60. The image reading device (1A) further includes a transmission section (such as an interface (I/F) 47) that transmits output image data DA4 corresponding to the document region A1 extracted from the read image data DA1 and the dirt position P1 to the control device 60. The control device 60 includes a reception section (such as an I/F 67) that receives the output image data DA4 and the dirt position P1 and an image processor 68 that diminishes a line L1 extending in the relative movement direction D1 in the output image data DA4 based on the dirt position P1.

In this mode, the dirt position P1 detected by the image reading device (1A) is supplied to the control device 60, and the control device 60 performs a process of diminishing the line L1 extending in the relative movement direction D1 in the output image data DA4 based on the dirt position P1. According to this mode, in the image reading system including the image reading device, even when the reading section has dirt including an adhering substance, such as dust, and a scratch, image processing may be performed while adverse effect of the dirt is diminished.

Tenth Mode

Furthermore, the control device 60 also has technical features. That is, the control device 60 of a mode of this technique includes the reception section (67) that receives the output image data DA4 and the dirt position P1 and an image processor 68 that diminishes a line L1 extending in the relative movement direction D1 in the output image data DA4 based on the dirt position P1. Accordingly, this mode provides a control device capable of performing the image processing, while adverse effect of dirt is diminished, even when the reading section has dirt including an adhering substance, such as dust, and a scratch.

Eleventh Mode

Furthermore, a method for extracting a document region according to a mode of this technique is employed in the image reading device (1A) including the reading section 20, the driving section UD, and the memory (38), and includes steps (A) and (B) below.

(A) A dirt detection step ST1 of detecting the dirt position P1 of the reading section 20 in the pixel column direction D2 that intersects with the relative movement direction D1.

(B) An extraction step of extracting the document region A1 from the read image data DA1 based on the analysis image data DA3.

The document region extraction method, in the extraction step ST2, includes searching the analysis image data DA3 for an edge candidate position P2 where the background region A2 changes to the document region A1 inward from an edge portion (for example, a left side DA1c or a right side DA1d) in the pixel column direction D2, continuing the search when the retrieved edge candidate position P2 corresponds to the dirt portion P1, and extracting the document region A1 from the read image data DA1 in the retrieved edge candidate position P2 when the retrieved edge candidate position P2 does not correspond to the dirt position P1.

Accordingly, this mode provides a document region extraction method capable of performing the document region extraction while adverse effect of dirt is diminished, even when the reading section has the dirt including an adhering substance, such as dust, and a scratch.

Note that the foregoing second to eighth modes may be added to the eleventh mode.

Furthermore, this technique is applicable to a composite device including the image reading device described above, a composite system including the image reading system described above, an image reading method employed in the image reading device described above, an image generation method employed in the image reading system described above, an image reading program that causes a computer to realize a function corresponding to the controller described above, an image processing program that causes a computer to realize a function corresponding to the image processor described above, a computer readable medium storing the programs described above, and the like.

2. CONCRETE EXAMPLE OF CONFIGURATION OF IMAGE READING SYSTEM INCLUDING IMAGE READING DEVICE

FIG. 1 is a diagram schematically illustrating appearance of the scanner 1A as a concrete example of the image reading device. FIG. 2 is a vertical cross sectional view schematically illustrating the document transport path 10 of the scanner 1A. FIG. 3 is a diagram schematically illustrating a configuration of the image reading system SY1.

As illustrated in FIG. 3, the image reading system SY1 includes the scanner 1A and the control device 60. The scanner 1A illustrated in FIGS. 1 and 2 is a document scanner capable of reading both sides of the document P0 that is an example of a medium.

Note that, in an X-Y-Z coordinate system illustrated in FIGS. 1, 2, and so on, an X direction corresponds to a width direction of the scanner 1A and a width direction of the document P0, a Y direction corresponds to a direction orthogonal to the X direction and a transport direction of the document P0, and a Z direction corresponds to a direction orthogonal to the X and Y direction and a direction substantially orthogonal to surfaces of the document P0. The Y direction also corresponds to the relative movement direction D1 of the document P0 and the reading section 20, and the X direction also corresponds to the pixel column direction D2 that intersects with the relative movement direction D1. Here, the X and Y directions may not be orthogonal to each other as long as the X and Y directions intersect with each other, the X and Z directions may not orthogonal to each other as long as the X and Z directions intersect with each other, and the Y and Z directions may not be orthogonal to each other as long as the Y and Z directions intersect with each other. Furthermore, a side in a +Y direction that is a direction of an arrow mark in the Y direction is determined as a device front side, and a side in a −Y direction that is opposite to the +Y direction is determined as a device rear side. The side in the −Y direction from which the document P0 is supplied is referred to as an upstream where appropriate, and the side in the +Y direction to which the document P0 is transported is referred to as a downstream where appropriate.

The scanner 1A illustrated in FIGS. 1 and 2 includes a device body 2 incorporating the reading section 20 that reads an image on the document P0. The device body 2 includes a lower unit 3 and the upper unit 4. The upper unit 4 is openable and closable relative to the lower unit 3 with a rotation support point on the downstream in a document transport direction at a center. The rotation support point is constituted by a rotation shaft disposed in the X direction in the vicinity of a front edge portion of the scanner 1A. The user may open the closed upper unit 4 by rotating the upper unit 4 toward a device front side, and may easily cope with jam of the document P0 and the like by exposing the transport path 10 of the document P0. The user may close the opened upper unit 4 by rotating the upper unit 4 so that the upper unit 4 fits the lower unit 3, and in this way, the transport path 10 is closed. The upper unit 4 is an example of a cover portion that opens and closes the transport path 10.

A document mounting section 11 having a mounting surface 11a on which the supplied document P0 is mounted is disposed on a rear side of the device body 2. The document mounting section 11 is detachable from the device body 2. A pair of right edge guide 12 and left edge guide 12 that guides side edges of the document P0 in the X direction that is the width direction intersecting with the Y direction that is the direction in which the document P0 is supplied is disposed on the document mounting section 11. Furthermore, the document mounting section 11 includes a first paper support 8 and a second paper support 9. The first paper support 8 and the second paper support 9 may be accommodated inside the document mounting section 11 and may be drawn from the document mounting section 11 as illustrated in FIG. 1 so that a length of the mounting surface 11a is adjustable.

The device body 2 includes, on the device front side of the upper unit 4, an operation panel 7 that realizes a user interface, that is, an UI, for performing an operation of various reading settings and an operation of execution of reading or indicating content of the reading settings and the like. The operation panel 7 is a so-called touch panel that may perform both display and input in this embodiment, and serves as both an operation section for performing various operations and a display section for displaying various information.

A supply port 6 that communicates with an inside of the device body 2 is disposed on an upper portion of the upper unit 4. The document P0 mounted on the document mounting section 11 is supplied from the supply port 6 to the reading section 20 inside the device body 2. A sheet ejection tray 5 that receives the ejected document P0 is disposed on the lower unit 3 on the device front side.

The transport path 10 illustrated in FIG. 2 is a space sandwiched between the lower unit 3 and the upper unit 4 and indicates a trajectory of passing of the document P0. The document mounting section 11, rollers 14 and 15, a first document detection section 31, a multi-feed detection section 30, a transport roller pair 16, a second document detection section 32, the reading section 20, and an ejection roller pair 17 are disposed on the transport path 10 illustrated in FIG. 2 in this order in the transport direction D1.

In the document mounting section 11 on an uppermost stream of the transport path 10 has a sensor, not illustrated, that determines whether the document P0 is mounted on the document mounting section 11.

In the transport path 10, on the downstream of the document mounting section 11, a feed roller 14 that feeds the document P0 mounted on the mounting surface 11a of the document mounting section 11 toward the reading section 20 and a separation roller 15 that nips the document P0 with the feed roller 14 so as to separate the document P0 are disposed. The feed roller 14 is driven to be rotated by a feed roller motor 45 illustrated in FIG. 3. The feed roller 14 obtains a rotation torque from the feed roller motor 45 and rotates in a counterclockwise direction in FIG. 2. The feed roller 14 is in contact with one of documents P0 that is in a lowermost position on the mounting surface 11a of the document mounting section 11. Therefore, when a plurality of documents P0 are set on the document mounting section 11 in the scanner 1A, the documents P0 are sequentially fed toward the downstream in order from one of the documents P0 nearest the mounting surface 11a. A transport roller motor 46 illustrated in FIG. 3 transmits a rotation torque through a torque limiter, not illustrated, to the separation roller 15.

When the documents P0 are not interposed between the feed roller 14 and the separation roller 15 or when only one document P0 is interposed, the separation roller 15 is rotated in accordance with occurrence of slip in the torque limiter, not illustrated, irrespective of the rotation torque supplied from the transport roller motor 46. In this case, a rotation direction of the separation roller 15 is a clockwise direction in FIG. 2. When a second document P0 or the others are further supplied between the feed roller 14 and the separation roller 15 in addition to the document P0 to be supplied, slip occurs between the documents. Accordingly, the separation roller 15 is rotated in the counterclockwise direction in FIG. 2 by a rotation torque supplied from the transport roller motor 46 so as to avoid multi-feed of the documents P0.

On the downstream of the feed roller 14 in the transport path 10, the transport roller pair 16, the reading section 20 that reads an image on the document P0, and the ejection roller pair 17 are disposed. The transport roller pair 16 includes a transport driving roller 16a that is driven to be rotated by the transport roller motor 46 illustrated in FIG. 3 and a transport driven roller 16b that is driven to be rotated in accordance with the rotation of the transport driving roller 16a. The document P0 that is nipped by the feed roller 14 and the separation roller 15 and that is fed to the downstream is nipped by the transport roller pair 16 and transported to the reading section 20 located on the downstream of the transport roller pair 16.

In the transport path 10, the first document detection section 31 is disposed between the feed roller 14 and the transport roller pair 16. An optical sensor or the like may be used as the first document detection section 31. The first document detection section 31 illustrated in FIG. 2 is an optical sensor having a light emitting section 31a and a light receiving section 31b that face each other with the transport path 10 interposed therebetween. The light receiving section 31b detects light that passes over the transport path 10 from the light emitting section 31a and transmits an electric signal indicating intensity of the detected light to the controller 40 illustrated in FIG. 3. When the transported document P0 blocks the light emitted from the light emitting section 31a, an electric signal indicating intensity of light detected by the light receiving section 31b is changed. Accordingly, the controller 40 may detect passing of a leading end and a trailing end of the document P0.

In the transport path 10, a multi-feed detection section 30 that detects multi-feed of the documents P0 is disposed between the first document detection section 31 and the transport roller pair 16. The multi-feed detection section 30 includes an ultrasonic transmission section 30a and an ultrasonic reception section 30b that are disposed so as to face each other with the transport path 10 interposed therebetween. The ultrasonic reception section 30b detects ultrasonic waves transmitted from the ultrasonic transmission section 30a through the transport path 10, and transmits an electric signal indicating intensity of the ultrasonic waves to the controller 40. When multi-feed occurs, an electric signal indicating intensity of ultrasonic waves of the ultrasonic reception section 30b is changed. Accordingly, the controller 40 may detect the multi-feed of the documents P0.

In the transport path 10, a second document detection section 32 is disposed on a downstream of the transport roller pair 16. An optical sensor or the like may be used as the second document detection section 32. The second document detection section 32 illustrated in FIG. 2 is a contact sensor having a lever. When the lever rotates in accordance with passing of the leading end or the trailing end of the document P0, an electric signal to be transmitted to the controller 40 is changed. When the electric signal transmitted from the second document detection section 32 to the controller 40 is changed, the controller 40 may detect the passed leading end of the passed trailing end of the document P0.

The controller 40 may obtain a position of the document P0 in the transport path 10 using the first document detection section 31 and the second document detection section 32 described above.

The reading section 20 disposed on the downstream of the second document detection section 32 in the transport path 10 includes an upper reading sensor 20A disposed on the upper unit 4 and a lower reading sensor 20B disposed on the lower unit 3. The upper reading sensor 20A reads an upper surface of the document P0 and outputs a result RS of the reading on the upper surface. The lower reading sensor 20B reads a lower surface of the document P0 and outputs a result RS of the reading on the lower surface. As the upper reading sensor 20A and the lower reading sensor 20B, a contact image sensor module (CISM) or the like may be used. The reading section 20 reads at least one of an image on the upper surface of the document P0 and an image on the lower surface of the document P0. The reading section 20 will be described hereinafter in detail.

The document P0 that has passed the reading section 20 in the transport path 10 is nipped by the ejection roller pair 17 positioned on the downstream of the reading section 20 and ejected from the ejection port 18 disposed on the device front side of the lower unit 3. The ejection roller pair 17 includes an ejection driving roller 17a that is driven to be rotated by the transport roller motor 46 illustrated in FIG. 3 and an ejection driven roller 17b that is driven to be rotated in accordance with the ejection driving roller 17a.

In this concrete example, the rollers 14 and 15, the roller pairs 16 and 17, and the motors 45 and 46 are an example of a driving section UD that relatively moves the document P0 and the reading section 20 in the relative movement direction D1.

As illustrated in FIG. 3, the scanner 1A includes, as a control system, the controller 40 and the RAM 38 that is a semiconductor memory. Here, the RAM is an abbreviation of "Random Access Memory". The RAM 38 is an example of a storage section. The controller 40 performs various control operations of the scanner 1A including control for feeding the document P0 and control for reading the document P0. A signal is supplied from the operation panel 7 to the controller 40, and a signal for display in the operation panel 7, in particular, for realizing the UI, is supplied from the controller 40 to the operation panel 7. The controller 40 controls the feed roller motor 45 that is a driving source of the feed roller 14 and the transport roller motor 46 that is a driving source of the separation roller 15 and the roller pairs 16 and 17. Detection signals are supplied from the detection sections 30 to 32 to the controller 40, and the controller 40 performs required control based on the detection signals. The controller 40 transmits a signal for controlling the reading section 20 to the reading section 20 so as to perform control for storing read image data DA1 based on a reading result RS supplied from the reading section 20 in the RAM 38 serving as a buffer.

The controller 40 includes a CPU 41 serving as a processor, a ROM 42 serving as a semiconductor memory, a storage section 43, and an I/F 47 that is an example of a transmission section. Here, "CPU" is an abbreviation of "Central Processing Unit", "ROM" is an abbreviation of "Read Only Memory", and "I/F" is an abbreviation of "Interface". The ROM 42 stores a program 44 that realizes various functions of the scanner 1A. The ROM 42 may be a semiconductor memory in which data including the program 44 is rewritable. The program 44 may be stored in the storage section 43, or may be read and executed in a RAM, for example, the RAM 38. The program 44 includes a UI program for controlling the UI displayed in the operation panel 7, various control programs required for transport and reading of a document, a dirt detection program for executing a reading section dirt detection process illustrated in FIG. 6, an extraction program for executing a document region extraction process illustrated in FIG. 11, a threshold value setting program for executing a threshold value setting process illustrated in FIG. 13, and an image transmission program for executing an image transmission process illustrated in FIG. 15. The storage section 43 is a nonvolatile memory in which data is readable and writable, and stores first reading data Ri of a reading reference surface 22a illustrated in FIG. 4. As the storage section 43, a nonvolatile semiconductor memory, such as a flash memory, a magnetic storage device, such as hard disk, and the like may be used. The CPU 41 performs various calculation processes in accordance with the program 44 and controls entire operation of the scanner 1A. The I/F 47 is coupled to the I/F 67 of the control device 60 and communicates with the I/F 67 in accordance with a predetermined communication standard so as to transmit various information to the control device 60 and receive various information from the control device 60.

The controller 40 of this concrete example performs control for storing extracted image data DA2 based on the reading result RS supplied from the reading section 20 in the RAM 38, control for generating analysis image data DA3 in the RAM 38 using the extracted image data DA2, control for detecting a dirt position P1 of the reading section 20, and control for generating output image data DA4 using the read image data DA1 based on the analysis image data DA3 and the dirt position P1.

The control device 60 coupled to the scanner 1A includes a CPU 61 that is a processor, a ROM 62 that is a semiconductor memory, a RAM 63 that is a semiconductor memory, a storage device 64, an input device 65, a display device 66, and the I/F 67 that is an example of a reception section. The components 61 to 67 are electrically coupled to one another so as to input and output information to and from each other.

The storage device 64 stores an operating system, not illustrated, a reading control program PR1 that causes the control device 60 to realize an image processing function FU1, and the like. Information stored in the storage device 64 is read to the RAM 63 and used in image processing where appropriate. As the storage device 64, a magnetic storage device, such as hard disk, a nonvolatile semiconductor memory, such as a flash memory, or the like may be used. As the input device 65, a pointing device, hard keys including a keyboard, a touch panel attached to a surface of a display panel, or the like may be used. As the display device 66, a liquid crystal display panel or the like may be used. The input device 65 and the display device 66 constitute a UI of the control device 60. The I/F 67 is coupled to the I/F 47 of the scanner 1A and communicates with the I/F 47 in accordance with a predetermined communication standard so as to transmit various information to the scanner 1A and receive various information from the scanner 1A.

The CPU 61 executes the reading control program PR1 read from the storage device 64 to the RAM 63 so as to perform image processing corresponding to the image processing function FU1. The reading control program PR1 causes the control device 60 that is a computer to function as an image processor 68 corresponding to the image processing function FU1. A computer readable medium storing the reading control program PR1 is not limited to the storage device 64 and may be a recording medium outside the control device 60.

FIG. 4 is a diagram schematically illustrating a configuration of the reading section 20. Note that the upper reading sensor 20A and the lower reading sensor 20B have a point symmetric configuration in FIG. 4 and basically have the same configuration. Therefore, the configuration of the lower reading sensor 20B is focused.

The lower reading sensor 20B includes a transmissive plate 21, a reference plate 22, a light guide 23, a lens 24, and a line sensor 25. The lower reading sensor 20B has a long shape extending in the pixel column direction D2, and the transmissive plate 21, the reference plate 22, the light guide 23, the lens 24, and the light sensor 25 also have a long shape extending in the pixel column direction D2.

The transmissive plate 21 may be formed by water-white glass, a resin plate, such as a water-white acrylic plate, or the like. The transmissive plate 21 has an outer surface, that is, a surface facing the upper reading sensor 20A, that serves as a reading surface for reading the document P0 and that forms the transport path 10 for the document P0.

The reference plate 22 is read by the line sensor 25 of the upper reading sensor 20A facing the reference plate 22 for performing shading correction. In the reference plate 22, a reading reference surface 22a faces the upper reading sensor 20A. As the reference plate 22, a resin plate of white, gray, black, or the like, or a metallic plate colored by white, gray, black, or the like may be used, for example.

The light guide 23 is a light guiding member for emitting light to the document P0 or the reference plate 22, and guides light emitted from a light source, not illustrated, in the pixel column direction D2 to the upper reading sensor 20A that faces the light guide 23. In this case, a light emitting diode (LED) may be used as the light source, for example. Alternatively, a fluorescence lamp or the like may be used as the light source. The light emitted from the light guide 23 to the upper reading sensor 20A is reflected by the document P0 or the reading reference surface 22a of the upper reading sensor 20A, reaches the line sensor 25 through the lens 24, and is measured by the line sensor 25. The line sensor 25 includes a large number of photoelectric conversion elements aligned in the pixel column direction D2. Although not particularly limited, arrangement density of the photoelectric conversion elements is in a range from approximately 300 dpi to approximately 600 dpi, for example. Examples of the photoelectric conversion elements include photodiodes. One photoelectric conversion element corresponds to one pixel, and the line sensor 25 outputs reading results RS measured by the individual photoelectric conversion elements to the RAM 38. Although the line sensor 25 is a CMOS image sensor in this concrete example, a solid-state image sensing device, such as a line sensor or an area sensor constituted by a CCD or the like may be used as a photometric sensor. Here, CMOS is an abbreviation of "Complementary Metal-Oxide Semiconductor".

Figure 5:
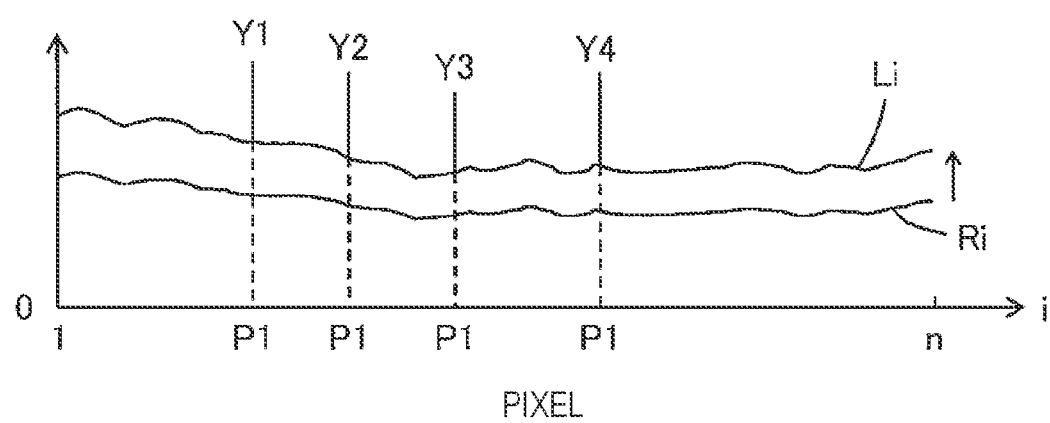
FIG. 5 is a graph schematically illustrating an example of first reading data and second reading data on a reading reference surface.

FIG. 5 is a graph schematically illustrating an example of first reading data Ri and second reading data Li on the reading reference surface 22a. The first reading data Ri is reference data obtained by reading the reference plate 22 in a process of fabricating the scanner 1A, that is, before product shipping, in a state in which dirt is not attached to the transmissive plate 21. When receiving an instruction for generating the first reading data Ri from the operation panel 7, the controller 40 causes the reading section 20 to read the reference plate 22 so as to obtain the first reading data Ri from the reading section 20 and cause the storage section 43 to store the first reading data Ri. The second reading data Li is obtained by reading the reference plate in a usage environment of a user, that is, after product shipping, in a state in which dirt may be attached to the transmissive plate 21, and is so-called data for shading correction. In FIG. 5, an axis of abscissae denotes pixels, and a first pixel is located in a left end and n-th pixel is located in a right end. When a short side of an A4-size document is read in 600 dpi, for example, n is 5100. Note that it is not necessarily the case that the first pixel and the n-th pixel are located in the both ends of the line sensor 25. The n number of pixels is preferably a value taking a little margin into consideration for a document size. In FIG. 5, an axis of ordinates indicates reading values of the pixels, that is, light receiving intensity.

When the scanner 1A is used, a foreign matter, such as a fingerprint, paper dust, pencil dust, correction fluid, glue, and condensation, may be attached to the reading reference surface 22a of the transmissive plate 21. When such a foreign matter adheres to the reading reference surface 22a, an error occurs in a reading result. Similarly, even when the reading reference surface 22a has a scratch, an error occurs in a reading result.

When dirt including an adhering substance, such as dust, and a scratch is attached to the transmissive plate 21, significant points Y1 to Y4, for example, appear in the second reading data Li. The first reading data Ri serving as the reference data does not include any significant point. Accordingly, as a basic concept, when a difference between the reading data Ri and the reading data Li exceeds a set threshold value Shi (i=1 to n) in a pixel Xi (i=1 to n) illustrated in FIG. 6, the pixel Xi is determined as a dirt position P1. It is assumed that, in this concrete example, the difference is denoted by an absolute value equal to or larger than 0, and the threshold value Shi is a positive value. Each of the difference and the threshold value Shi may clearly be a positive value or a negative value.

However, a level of light emitted from the light guide 23 when the first reading data Ri is obtained and a level of light emitted from the light guide 23 when the second reading data Li is obtained may have a difference. In the example of FIG. 5, the second reading data Li is obtained when a level of the first reading data Ri is increased. In this case, to compare the reading data Ri with the reading data Li, the level of the first reading data Ri is required to be increased to the level of the second reading data Li. In this concrete example, assuming that an arithmetic average value of the first reading data Ri of pixels Xi is determined as AR and an arithmetic average value of the second reading data Li of the pixels Xi is determined as AL, a threshold value Shi is applied to a difference between adjustment data RRi obtained by multiplying the first reading data Ri by a rate AL/AR and the second reading data Li for each pixel Xi.

FIG. 6 is a flowchart schematically illustrating a dirt detection process of detecting a dirt position P1 of the reading section 20 in the pixel column direction D2. The controller 40 that performs the dirt detection process performs a dirt detection process ST1 for detecting a dirt position P1 of the reading section 20. The controller 40 starts the dirt detection process (a) when the scanner 1A is powered, (b) when reading on the document P0 is terminated, and (c) when the upper unit 4 is closed. Note that, the dirt detection process may be performed in at least one of the timings (a), (b), and (c). The dirt detection process includes step S102 to step S120. Hereinafter, a term "step" is omitted and individual step numbers are assigned in parentheses.

When the dirt detection process is started, the controller 40 reads the first reading data Ri from the storage section 43 (S102). Furthermore, the controller 40 obtains the second reading data Li from the reading section 20 by causing the reading section 20 to read the reference plate 22 (S104). After the second reading data Li is obtained, the controller 40 generates adjustment data RRi by adjusting the level of the first reading data Ri (S106). The adjustment data RRi may be generated by multiplying the first reading data Ri of the individual pixels Xi by a rate AL/AR that is a rate of the average value AL of the second reading data Li of the pixels Xi to the average value AR of the individual first reading data Ri of the pixels Xi.

After generating the adjustment data RRi, the controller 40 assigns 1 to a variable i that identifies a pixel Xi (S108) and calculates a difference Di between the adjustment data RRi and the second reading data Li (S110).

$$Di=|RRi-Li|$$

After calculating the difference Di, the controller 40 branches the process in accordance with a determination as to whether the difference Di is equal to or larger than the threshold value Shi (S112). When the difference Di is equal to or larger than the threshold value Shi, the controller 40 sets the pixel Xi in the dirt position P1 (S114). The setting process in step S114 may correspond to a process of storing the value of the variable i in a dirt position data table prepared in the RAM 38, for example. When the difference Di is smaller than the threshold value Shi, the controller 40 determines that the pixel Xi does not have an error (S116), and therefore, does not set the pixel Xi in the dirt position P1. After the process in step S114 or the process in step S116, the controller 40 determines whether the variable i reaches the n number of pixels (S118). When the variable i is smaller than the n number of pixels, the controller 40 increments the value of the variable i by 1 (S120) and the process returns to step S110. When the variable i reaches the n number of pixels, the controller 40 terminates the dirt detection process. Accordingly, the process of detecting the dirt position P1 is performed on the first pixel to the n-th pixel based on the second reading data Li and the first reading data Ri.

FIG. 7 is a diagram schematically illustrating a state in which the reading section 20 reads the document P0.

The reading section 20 reads the document P0 that is transported in the relative movement direction D1 along the transport path 10. The reading section 20 successively outputs results RS of the reading performed on the document P0 to the RAM 38. The individual reading results RS are read data having reading values of R, G, and B in a plurality of pixels PX1 included in a pixel column PXL in the pixel column direction D2. Here, R indicates red, G indicates green, and B indicates blue. Although not particularly limited, resolutions of the reading results RS are in a range from 300 dpi to 600 dpi, for example. The reading results RS are successively stored in the RAM 38, and as a result, read image data DA1 is generated in the RAM 38. Although not particularly limited, resolution of the read image data DA1 in the relative movement direction D1 is in a range from 300 dpi to 600 dpi, for example.

Although described below, the controller 40 performs a document region extraction process of extracting a document region A1 from the read image data DA1 in an edge region in which a background portion changes to a document portion in a direction from four sides DA1*a*, DA1*b*, DA1*c*, and DA1*d* to a center in a read image. Here, an edge region is searched for downward from an upper side DA1*a*, upward from a lower side DA1*b*, rightward from a left side DA1*c*, and leftward from a right side DA1*d*.

When dirt is detected in a portion of the reading section 20, a color of the document P0 is not properly read in a dirt portion, and therefore, a line L1 is generated in the relative movement direction D1. The line extending in the relative movement direction D1 is also referred to as a vertical line hereinafter. The read image data DA1 having a vertical line L1 in the dirt position P1 of the reading section 20 is illustrated in FIG. 7. The vertical line may be separately generated outside an actual document portion in the read image as illustrated in FIG. 7 or may be generated inside the actual document portion in the read image. It is assumed that the vertical line L1 is separately generated outside the actual document portion. In this case, when a document portion is extracted from the read image in a boundary B9 where a color of a background changes to another color from the four sides DA1*a*, DA1*b*, DA1*c*, and DA1*d* of the read image to the center, a region larger than the actual document portion is extracted. Therefore, when dirt is attached to the reading section 20, an extraction result is changed from a case where dirt is not attached to the reading section 20, and therefore, appropriate output image data may not be obtained.

In this concrete example, when the vertical line L1 is generated in a portion separate from the document portion outward in the read image, a position of the vertical line L1 is not determined as an extraction position but the document region A1 is extracted using a boundary B1 positioned between the document portion and the background portion. In the document region extraction process, an edge candidate position P2 is temporarily not determined as an extraction position when the edge candidate position P2 matches the dirt position P1 in the pixel column direction D2, whereas the edge candidate position P2 is determined as an extraction position when the edge candidate position P2 does not match the dirt position P1 in the pixel column direction D2. Accordingly, the background region A2 out of the document region A1 is appropriately removed.

Hereinafter, various cases C1 to C7 in which output image data DA4 is generated by extracting the document region A1 from the read image data DA1 are described with reference to FIG. 8.

Figure 8:
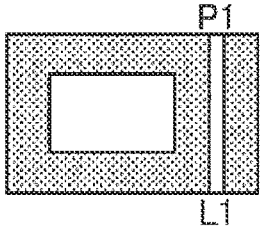
FIG. 8 is a diagram schematically illustrating an example of the document region extraction process performed in accordance with a dirt position.

FIG. 8 is a diagram schematically illustrating the document region extraction process performed in accordance with a dirt position P1. For simplicity, a vertical line L1 is exaggerated.

In the case C1, a vertical line L1 is separately located outside a document portion. When an edge candidate position P2 is searched for leftward from the right side DA1*d* illustrated in FIG. 7, a first edge candidate position P2 is not determined as an edge position since the first edge candidate position P2 matches a dirt position P1. Consequently, a rectangle document region A1 that does not include the vertical line L1 is extracted, and output image data DA4 representing an image of the document region A1 is generated.

In the case C2, a vertical line L1 is inside a document portion. When an edge candidate position P2 is searched for leftward from the right side DA1*d*, a first edge candidate position P2 is determined as an edge position since the first edge candidate position P2 does not match a dirt position P1. Consequently, the document region A1 is extracted using a portion between the document portion and a background portion as a boundary B1.

In the case C3, a right edge of a vertical line L1 matches a right edge of a document portion. When an edge candidate position P2 is searched for leftward from the right side DA1*d*, a first edge candidate position P2 is determined as an edge position since a second edge candidate position is not detected until an intermediate position of the read image although the first edge candidate position P2 matches a dirt position P1. Consequently, the document region A1 is extracted using a portion between the document portion and a background portion as a boundary B1.

In the case C4, a left edge of a vertical line L1 matches a right edge of a document portion. When an edge candidate position P2 is searched for leftward from the right side DA1*d*, a first edge candidate position P2 is determined as an edge position since a second edge candidate position is not detected until an intermediate position of the read image although the first edge candidate position P2 matches a dirt position P1. Consequently, the document region A1 is extracted using the right edge of the vertical line L1 coupled to the document portion as a boundary B1. Although the document region A1 including the vertical line L1 added to the document portion is extracted in the case C4, the vertical line L1 is not a matter since the vertical line L1 is narrow.

The concepts of the cases C1 to C4 are applicable even when the document P0 is in skew, that is, in an oblique state.

In the case C5, a document portion is skew and a vertical line L1 is separately located outside the document portion. When an edge candidate position P2 is searched for leftward from the right side DA1*d*, a first edge candidate position P2 is not determined as an edge position since the first edge candidate position P2 matches a dirt position P1. Consequently, a document region A1 that does not include the vertical line L1 is extracted. Note that the rectangular document region A1 that is circumscribed around the skew document portion is extracted from the read image having the skew document portion.

In the case C6, a document portion is skew, and a vertical line L1 is inside the document portion. When an edge candidate position P2 is searched for leftward from the right side DA1*d*, a first edge candidate position P2 is determined as an edge position since the first edge candidate position P2 does not match a dirt position P1. Consequently, a rectangular document region A1 that is circumscribed around the skew document portion is extracted.

In the case C7, a document portion is skew, the vertical line L1 is coupled to a rightmost corner of the document portion. When an edge candidate position P2 is searched for leftward from the right side DA1*d*, a first edge candidate position P2 is determined as an edge position since a second edge candidate position is not detected until an intermediate position of the read image although the first edge candidate position P2 matches a dirt position P1. Consequently, a rectangular document region A1 is extracted using a right edge of the vertical line L1 coupled to the document portion as a boundary B1. Although the document region A1 including the vertical line L1 added to the document portion is extracted in the case C7, the vertical line L1 is not a matter since the vertical line L1 is narrow.

Figure 10:
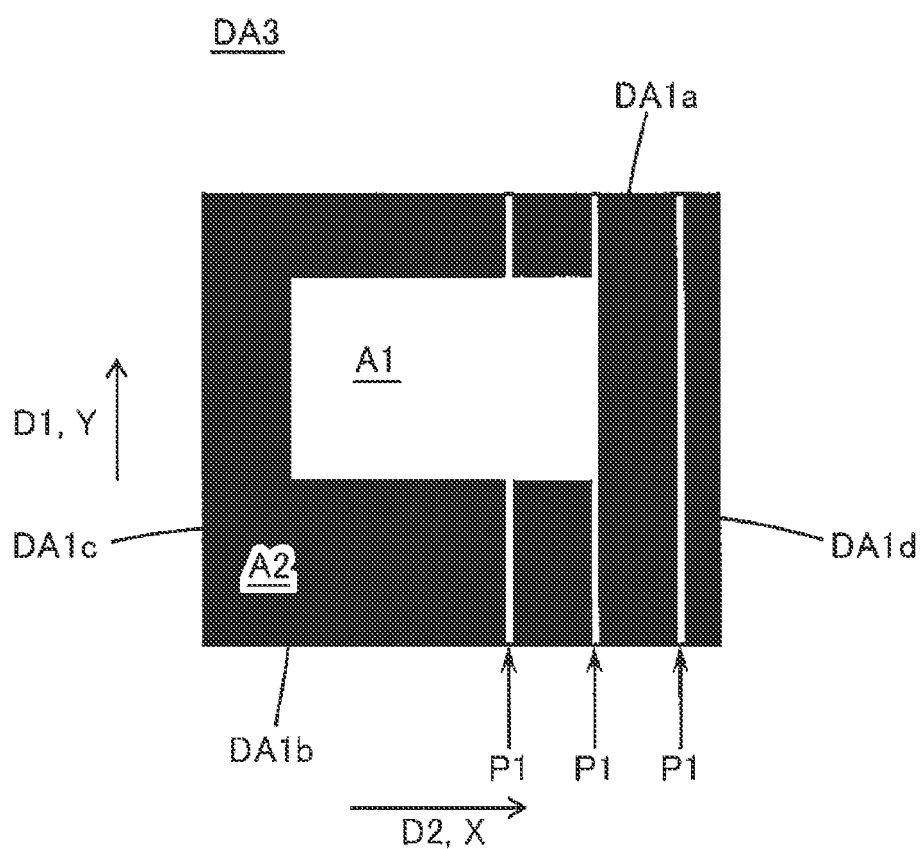
FIG. 10 is a diagram schematically illustrating an example of analysis image data.

The controller 40 of this concrete example searches for the edge candidate position P2 based on the analysis image data DA3 generated using the reading results RS as illustrated in FIGS. 9 and 10. FIG. 9 is a diagram schematically illustrating an example of generation of the read image data DA1 and the analysis image data DA3 using the reading results RS. FIG. 10 is a diagram schematically illustrating an example of the analysis image data DA3. The analysis image data DA3 illustrated in FIGS. 9 and 10 is binary data for determining whether to be the document region A1 or the background region A2.

As described above, the reading section 20 successively outputs the reading results RS having reading values of R, G, and B in the plurality of pixels PX1 included in the pixel column PXL in the pixel column direction D2 to the RAM 38. The controller 40 performs control for storing the read image data DA1 based on the reading results RS supplied from the reading section 20 in the RAM 38. The read image data DA1 has reading values of R, G, and B in the plurality of pixels PX1 arranged in the relative movement direction D1 and the pixel column direction D2. Resolution of the read image data DA1 in the relative movement direction D1 and the pixel column direction D2 illustrated in FIG. 9 is 300 dpi or 600 dpi.

Furthermore, the controller 40 performs control for storing extracted image data DA2 based on the reading results RS supplied from the reading section 20 in the RAM 38. The extracted image data DA2 also has reading values of R, G, and B in the plurality of pixels PX1 arranged in the relative movement direction D1 and the pixel column direction D2. Resolution of the extracted image data DA2 in the relative movement direction D1 and the pixel column direction D2 illustrated in FIG. 9 is 75 dpi. The controller 40 performs sampling on four pixels to one pixel in the relative movement direction D1 and the pixel column direction D2 when the reading results RS represent 300 dpi and performs sampling on eight pixels to one pixel in the relative movement direction D1 and the pixel column direction D2 when the reading results RS represent 600 dpi so as to generate the extracted image data DA2.

The controller 40 performs control for storing binary analysis image data DA3, in the RAM 38, obtained by applying the first threshold value TH1 for discriminating a color of the document region A1 from a color of the background region A2 to the individual pixels PX1 of the extracted image data DA2. It is assumed here that individual colors of R, G, and B in the reading reference surface 22$a$ illustrated in FIG. 4 are determined as (Ra, Ga, Ba), and a first setting range that is a setting range based on the color (Ra, Ga, Ba) is determined as follows: $Rb \leq Ra \leq Rc$, $Gb \leq Ga \leq Gc$, and $Bb \leq Ba \leq Bc$. Boundary values Rb, Rc, Gb, Gc, Bb, and Bc are collectively referred to as the first threshold value TH1. The controller 40 assigns, in the plurality of pixels PX1 included in the extracted image data DA2, black to pixels having an R value equal to or larger than Rb and equal to or smaller than Rc, a G value equal to or larger than Gb and equal to or smaller than Gc, and a B value equal to or larger than Bb and equal to or smaller than Bc, and white to the other pixels so as to generate the analysis image data DA3. Accordingly, the analysis image data DA3 is generated based on the reading results RS while the background region A2 is determined as a region of a color in the first setting range based on the color of the reading reference surface 22$a$. The controller 40 generates the analysis image data DA3 based on the first threshold value TH1 and the reading results RS. Note that, in the analysis image data DA3, a value indicating black and a value indicating white may be 1 and 0, respectively, or a value indicating black and a value indicating white may be 0 and 1, respectively. In the analysis image data DA3 illustrated in FIG. 10, a document portion and vertical lines corresponding to three dirt positions P1 are represented by white and the other portions are represented by black.

FIG. 11 is a flowchart schematically illustrating the document region extraction process of extracting the document region A1 from the read image data DA1 based on the analysis image data DA3. The controller 40 performs the extraction process ST2 of extracting the document region A1 from the read image data DA1 based on the analysis image data DA3. The controller 40 starts the extraction process when the reading section 20 starts reading on the document P0.

When the extraction process is started, the controller 40 generates the extracted image data DA2 described above based on the reading results RS supplied from the reading section 20 (S202). After generating the extracted image data DA2, the controller 40 generates the analysis image data DA3 by applying the first threshold value TH1 to the extracted image data DA2 (S204). Here, the controller 40 branches the process in accordance with a determination as to whether a setting for automatically extracting the document region A1 is received from the operation panel 7 or the control device 60 illustrated in FIG. 3 (S206). When receiving a setting of a standard size, such as an A4 size or a B5 size, from the operation panel 7 or the control device 60, the controller 40 performs a process of extracting the read image data DA1 in the set standard size (S224) and terminates the extraction process.

When receiving the setting for automatically extracting the document region A1 from the operation panel 7 or the control device 60, the controller 40 sets a direction for searching the analysis image data DA3 for an edge candidate (S208). Referring to FIGS. 7 and 10, four directions correspond to the edge candidate search direction, that is, a lower direction from the upper side DA1$a$, an upper direction from the lower side DA1$b$, a right direction from the left side DA1$c$, and a left direction from the right side DA1$d$. The controller 40 sets one of the four directions.

After the setting of the search direction, the controller 40 searches for an edge candidate position P2 where the background region A2 changes to the document region A1 inward from the edge portion (for example, DA1$a$, DA1$b$, DA1$c$, or DA1$d$) of the analysis image data DA3 (S210). The controller 40 searches all pixels in turn aligned in the search direction for the edge candidate position P2. For example, the search direction corresponds to the left direction along the pixel column direction D2, the entire pixel column PXL aligned along the pixel column direction D2 is searched for the edge candidate position P2 in turn leftward from a pixel of the right side DA1$d$. In the analysis image data DA3, a first portion where, in the entire pixel column PXL, the pixel PX1 is changed from black to white corresponds to the edge candidate position P2 that is searched for in step S210. When the pixel column direction D2 is focused, the controller 40 searches the analysis image data DA3 for the edge candidate position P2 inward from the both edge portions in the pixel column direction D2.

When the search direction is the upward direction or the downward direction along the relative movement direction D1, the vertical line L1 is not determined as the edge candidate position P2, and therefore, an upper end or a lower end of the document portion theoretically corresponds to the edge candidate position P2. When the search direction corresponds to the right direction or the left direction along the pixel column direction D2, a portion where the vertical line L1 is detected is determined as the edge candidate position P2 in the cases C1, C3, C4, C5, and C7 illustrated in FIG. 8, and the left edge or the right edge of the document portion is determined as the edge candidate position P2 in the cases C2 and C6 illustrated in FIG. 8.

When the search direction corresponds to the right direction or the left direction along the pixel column direction D2, the controller 40 branches the process in accordance with a determination as to whether the obtained edge candidate position P2 corresponds to the dirt position P1 of the reading section 20 (S212). When the dirt position P1 has higher resolution than the analysis image data DA3, the controller 40 converts the dirt position P1 into resolution of the analysis image data DA3, for example, and determines whether the edge candidate position P2 matches the dirt position P1 obtained after the conversion. In the example illustrated in FIG. 8, the dirt position P1 has a resolution of 300 dpi or 600 dpi, and the analysis image data DA3 has a resolution of 75 dpi. In this case, the controller 40 converts the dirt position P1 into a position of a resolution of 75 dpi, and determines whether the edge candidate position P2 matches the dirt position P1 having the resolution of 75 dpi.

Note that, when the search direction is the upper direction or the lower direction along the relative movement direction D1, the vertical line L1 does not serve as the edge candidate position P2. In this case, the controller 40 may proceed from step S212 to step S214 at all times.

When the edge candidate position P2 does not correspond to the dirt position P1 as in the cases C2 and C6 illustrated in FIG. 8, the controller 40 extracts the document region A1 from the read image data DA1 at the edge candidate position P2 in the search direction (S214) and proceeds to step S222.

As in the cases C1, C3, C4, C5, and C7 illustrated in FIG. 8, when the edge candidate position P2 corresponds to the dirt position P1, the controller 40 continues the search for a next edge candidate position P2 until an intermediate position of the analysis image data DA3 in the search direction (S216). After the process in step S216, the controller 40 branches the process in accordance with a determination as to whether a next edge candidate position P2 is detected in step S216 (S218). When a next edge candidate position P2 is detected as in the cases C1 and C5 illustrated in FIG. 8, the controller 40 returns to step S212. When a next edge candidate position P2 also corresponds to the dirt position P1, a further next edge candidate position P2 is searched for (S216), and then the determination process is performed in step S218. Accordingly, even when a plurality of vertical lines L1 are separately positioned outside the document portion in the read image, the vertical lines L1 are not determined as an edge position. When a further next edge candidate position P2 is detected and the further next edge candidate position does not correspond to the dirt position P1, the document region A1 is extracted from the read image data DA1 at the edge candidate position P2 in step S214.

When a next edge candidate position P2 is not detected in step S218 as in the cases C3, C4, and C7 illustrated in FIG. 8, the controller 40 extracts the document region A1 from the read image data DA1 at the first edge candidate position P2 obtained in step S210 in the search direction (S220) and proceeds to step S222. Accordingly, when an edge candidate position P2 is not further retrieved before the intermediate portion in the pixel column direction D2 of the analysis image data DA3 after the edge candidate position P2 corresponding to the dirt position P1 is retrieved, the controller 40 extracts the document region A1 from the read image data DA1 at the retrieved edge candidate position P2.

After the process in step S214 or the process in step S220, the controller 40 determines whether all the search directions have been set (S222). When at least one of the search directions has not been set, the controller 40 returns to step S208. When all the search directions have been set, the controller 40 terminates the document region extraction process.

The document region extraction process described above may determine whether each of the portions of the read image is the document region A1 or the background region A2 based on the analysis image data DA3 and generate the output image data DA4 by extracting the document region A1 from the read image data DA1.

As described above, a position of the vertical line L1 does not serve as an extraction position even when the vertical line L1 is in a portion separate from the document portion outward in the read image, and the document region A1 is extracted using the boundary B1 positioned between the document portion and the background portion. When the document portion and the vertical line L1 are coupled to each other in the read image, the document region A1 including the vertical line L1 is extracted. Even when the vertical line L1 is positioned at an end of the document region A1 to be extracted since the vertical line L1 is positioned at the end of the document portion, this is not a matter since the vertical line L1 is narrow. Accordingly, in this concrete example, the document region extraction process may be performed, while adverse effect of dirt is diminished even when the reading section 20 has the dirt including an adhering substance, such as dust, and a scratch.

3. APPLICATION EXAMPLE

Figure 12:
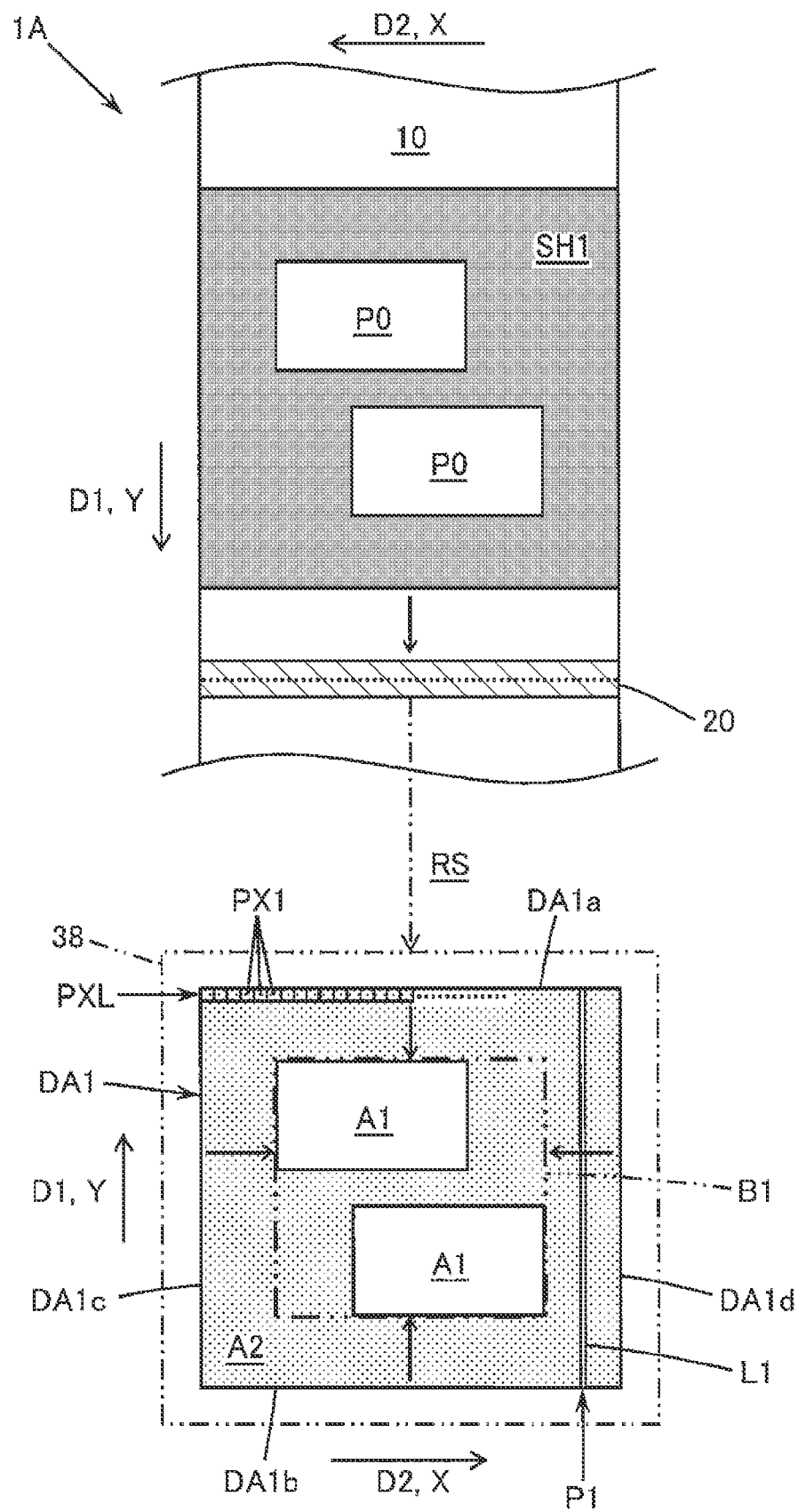
FIG. 12 is a diagram schematically illustrating a state in which a carrier sheet holding a document is read by the reading section.
Figure 13:
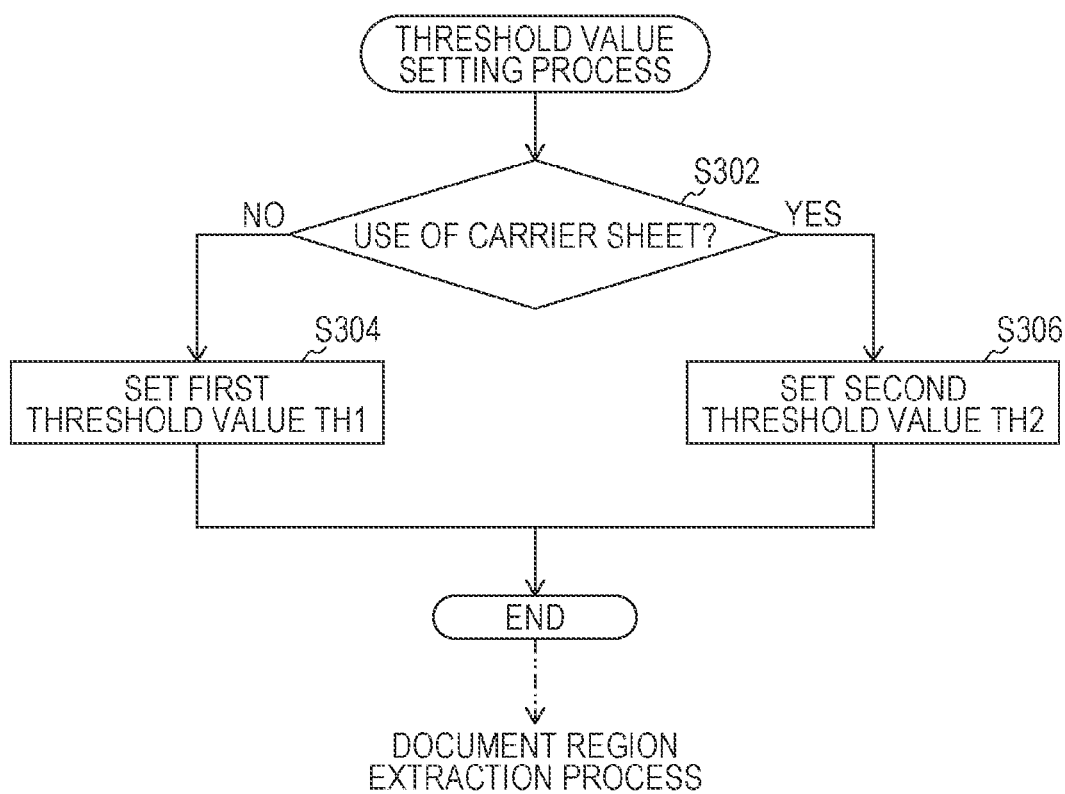
FIG. 13 is a flowchart schematically illustrating an example of a threshold value setting process.

As illustrated in FIG. 12, a document P0 held by a carrier sheet SH1 may be read by the scanner 1A. In this case, a background of the document P0 mounted on the carrier sheet SH1 has a color of the carrier sheet SH1 in a portion overlapping with the reading reference surface 22a of FIG. 4. Even when the carrier sheet SH1 is water-white, the color of the portion where the reading reference surface 22a overlaps with the carrier sheet SH1 is actually changed from an original color of the reading reference surface 22a. Therefore, when the scanner 1A reads the document P0 held by the carrier sheet SH1, a threshold value to be applied to the extracted image data DA2 is simply changed in the document region extraction process illustrated in FIG. 11.

FIG. 12 is a diagram schematically illustrating a state in which the carrier sheet SH1 holding the document P0 is read by the reading section 20. The carrier sheet SH1 in FIG. 12 holds two documents P0.

The carrier sheet SH1 having the documents P0 mounted thereon is transported in the relative movement direction D1 along the transport path 10, and then, read by the reading section 20. The reading section 20 successively outputs results RS of the reading performed on the documents P0 and the carrier sheet SH1 to the RAM 38. Read image data DA1 having a vertical line L1 in a dirt position P1 of the reading section 20 is illustrated in FIG. 12. The controller 40 performs a document region extraction process of extracting a document region A1 from the read image data DA1 at an edge region in which a background portion changes to a document portion in a direction from four sides DA1a, DA1b, DA1c, and DA1d to a center in a read image. When a plurality of documents P0 are held by the carrier sheet SH1, a rectangular document region A1 that is circumscribed around the plurality of documents P0 so as to accommodate all the documents P0 is extracted.

Referring to FIG. 9, the controller 40 generates analysis image data DA3 by applying a second threshold value TH2 for discriminating a color of the document region A1 from a color of the background region A2 to the extracted image data DA2 when the carrier sheet SH1 is used. It is assumed here that colors of R, G, and B in a portion where the carrier sheet SH1 overlaps with the reading reference surface 22d are represented by (Rd, Gd, Bd), and a second setting range based on the colors (Rd, Gd, Bd) is represented by "Re≤Rd≤Rf", "Ge≤Gd≤Gf", and "Be≤Bd≤Bf". The boundary values Re, Rf, Ge, Gf, Be, and Bf are collectively referred to as the second threshold value TH2. The controller 40 assigns, in the plurality of pixels PX1 included in the extracted image data DA2, black to pixels having an R value equal to or larger than Re and equal to or smaller than Rf, a G value equal to or larger than Ge and equal to or smaller than Gf, and a B value equal to or larger than Be and equal to or smaller than Bf and white to the other pixels so as to generate the analysis image data DA3. Accordingly, the analysis image data DA3 is generated based on the reading results RS while the background region A2 is determined as a region of a color within the second setting range based on a color of the portion where the carrier sheet SH1 overlaps with the reading reference surface 22a. The controller 40 generates the analysis image data DA3 based on the second threshold value TH2 and the reading results RS.

FIG. 13 is a flowchart schematically illustrating a threshold value setting process for applying the second threshold value TH2 to the document region extraction process illustrated in FIG. 11. The threshold value setting process is started when an input for setting a threshold value for generating analysis image data is received from the operation panel 7 or the control device 60 illustrated in FIG. 3.

When the threshold value setting process is started, the controller 40 determines whether the carrier sheet SH1 is to be used based on the received input (S302). When the carrier sheet SH1 is not to be used in the setting, the controller 40 sets the first threshold value TH1 as the threshold value in step S204 of FIG. 11 (S304) before terminating the threshold value setting process. In this case, when the document region extraction process illustrated in FIG. 11 is performed, the analysis image data DA3 is generated by applying the first threshold value TH1 to the extracted image data DA2. On the other hand, when the carrier sheet SH1 is to be used in the setting, the controller 40 sets the second threshold value TH2 as the threshold value in step S204 of FIG. 11 (S306) before terminating the threshold value setting process. In this case, when the document region extraction process illustrated in FIG. 11 is performed, the analysis image data DA3 is generated by applying the second threshold value TH2 to the extracted image data DA2.

Accordingly, even when the document P0 held by the carrier sheet SH1 is read by the scanner LA, the document region extraction process is appropriately performed while adverse effect of dirt is diminished. In the example illustrated in FIGS. 12 and 13, the control device 60 is not required to perform the extraction process of removing a carrier sheet portion outside the document region A1 from the output image data DA4, and therefore, direct storage of the output image data DA4 in a predetermined folder from the scanner 1A, direct attachment of the output image data DA4 to an electric mail, or the like may be enabled.

As illustrated in FIG. 14, it is preferable that a vertical line L1 that remains in the output image data DA4 is less noticeable. When the control device 60 does not obtain a position of the vertical line L1 at the time of image processing described above, the following process is required to be performed. First, the control device 60 checks values of the individual pixels PX1 of the output image data DA4 from end to end in the pixel column direction D2. After checking all the pixels in the output image data DA4, the control device 60 performs a vertical line extraction process of extracting what appears to be a vertical line. When the vertical line is extracted, the control device 60 performs an averaging process of making the vertical line less noticeable using pixel values of pixels on the right and the left of the vertical line.

However, since all the pixels PX1 of the output image data DA4 are required to be checked to extract a vertical line, a long period of time is required for the vertical line extraction process. Therefore, as illustrated in FIG. 15, the scanner 1A supplies information on the dirt position P1 of the reading section 20 to the control device 60 so that the period of time required for the vertical line extraction process is reduced.

FIG. 14 is a diagram schematically illustrating an example of a process of diminishing a line L1 in the output image data DA4 by performing image processing.

The output image data DA4 has reading values of R, G, and B in the plurality of pixels PX1 arranged in the relative movement direction D1 and the pixel column direction D2. In FIG. 14, an upper side DA4a, a lower side DA4b, a left side DA4c, and a right side DA4d in the output image data DA4 are illustrated. It is assumed here that, as illustrated in an enlarged view in a lower portion in FIG. 14, values of R, G, and B of at least one pixel 70 included in the vertical line L1 are denoted by (r0, g0, b0), values of R, G, and B of at least one pixel 71 located in the left vicinity of the vertical line L1 are denoted by (r1, g1, b1), and values of R, G, and B of at least one pixel 72 located in the right vicinity of the vertical line L1 are denoted by (r2, g2, b2). Note that, when the reference numeral 71 indicates a plurality of pixels, the pixel value (r1, g1, b1) is an arithmetic average value of pixel values of the individual pixels. When the reference numeral 72 indicates a plurality of pixels, the pixel value (r2, g2, b2) is an arithmetic average value of pixel values of the individual pixels. The control device 60 replaces the value of the at least one pixel 70 included in the vertical line L1 with an arithmetic average value (r3, g3, b3) of the pixel value (r1, g1, b1) and the pixel value (r2, g2, b2), for example.

FIG. 15 is a diagram schematically illustrating an example of a process of diminishing the line L1 in the output image data DA4. This process includes an image transmission process performed by the scanner 1A and an image adjustment process performed by the control device 60. Here, step S414 corresponds to the image processor 68 in FIG. 3.

After the document region extraction process illustrated in FIG. 11 is terminated, the scanner 1A starts the image transmission process to transmit the output image data DA4 corresponding to the document region A1 extracted from the read image data DA1 and the dirt position P1 of the reading section 20 to the control device 60 (S402). After the transmission process in step S402, the scanner 1A terminates the image transmission process.

The control device 60 that has received a request for receiving the output image data DA4 and the dirt position P1 from the scanner 1A starts the image adjustment process and receives the output image data DA4 and the dirt position P1 (S412). Thereafter, the control device 60 performs a process of diminishing the line L1 extending in the relative movement direction D1 in the output image data DA4 based on the dirt position P1 (S414), and then, terminates the image adjustment process. Consequently, in the control device 60, the vertical line L1 that remains in the output image data DA4 due to existence of dirt including an adhering substance, such as dust, and a scratch on the reading section 20 may become less noticeable by quickly performing the image processing.

Note that the scanner 1A may perform the vertical line diminishing process illustrated in FIG. 14 itself.

4. MODIFICATIONS

Various modifications of the present disclosure may be made.

For example, the image reading device may be a machine dedicated for one-side reading that has only one of the upper reading sensor 20A and the lower reading sensor 20B and therefore reads only one side of the document P0.

The processes described above may be modified where appropriate by changing an order or the like. For example, in the dirt detection process illustrated in FIG. 6, the process of reading the first reading data Ri performed in step S102 and the process of obtaining the second reading data Li performed in step S104 may be replaced with each other.

Although the analysis image data DA3 is generated using the extracted image data DA2 in the concrete example described above, the analysis image data DA3 may be generated by applying a threshold value to the read image data DA1. Accordingly, resolution of the analysis image data DA3 may be the same as that of the read image data DA1.

5. CONCLUSION

As described above, the present disclosure may provide a technique that enables the document region extraction process while adverse effect of dirt is diminished even when dirt including an adhering substance, such as dust, and a scratch is attached to the reading section, according to the various embodiments. Even techniques only including components associated with independent claims offer the basic operations and the basic effect described above.

Furthermore, a configuration obtained by replacing the components disclosed in the foregoing examples or modifying a combination of the components, a configuration obtained by replacing the components disclosed in general techniques and the foregoing examples or modifying a combination of the components, and the like may also be embodied. The present disclosure also includes these configurations.

What is claimed is:

1. An image reading device, comprising:
a reading section configured to read a document and output a result of the reading performed on the document;
a driving section configured to relatively move the document and the reading section in a relative movement direction;
a storage section configured to store read image data based on the reading result and analysis image data that is based on the reading result and that is used to discriminate a document region from a background region out of the document region; and
a controller configured to perform a dirt detection process of detecting a dirt position of the reading section in a pixel column direction intersecting with the relative movement direction and an extraction process of extracting the document region from the read image data based on the analysis image data, wherein
in the extraction process, the controller
searches the analysis image data for an edge candidate position where the background region changes to the document region inward from an edge portion in the pixel column direction, and
continues the search when the retrieved edge candidate position corresponds to the dirt position and extracts the document region from the read image data at the retrieved edge candidate position when the retrieved edge candidate position does not correspond to the dirt position.

2. The image reading device according to claim 1, wherein the controller searches the analysis image data for the edge candidate position inward from both edge portions in the pixel column direction in the extraction process.

3. The image reading device according to claim 1, wherein
the reading section has a reading reference surface,
the image reading device further includes a storage section configured to store the first reading data of the reading reference surface, and
the controller obtains second reading data of the reading reference surface and detects the dirt position based on the second reading data and the first reading data in the dirt detection process.

4. The image reading device according to claim 3, wherein
the background region has a color within a first setting range based on a color of the reading reference surface, and
the controller generates the analysis image data based on a first threshold value for discriminating a color of the document region from a color of the background region and the reading result.

5. The image reading device according to claim 3, wherein
the background region has a color within a second setting range based on a color of a portion of a carrier sheet overlapping with the reading reference surface, the carrier sheet holding the document, and
the controller generates the analysis image data based on a second threshold value for discriminating a color of the document region from a color of the background region and the reading result.

6. The image reading device according to claim 1 further comprising:
a cover portion configured to open or close a transport path of the document, wherein
the controller performs the dirt detection process in at least one of a timing when the image reading device is turned on, a timing when the reading performed on the document is terminated, and a timing when the cover portion is closed.

7. The image reading device according to claim 1, wherein the storage section stores the analysis image data of resolution smaller than the read image data.

8. The image reading device according to claim 1, wherein, after the edge candidate position corresponding to the dirt position is retrieved in the extraction process but thereafter the edge candidate position is not retrieved until an intermediate portion of the analysis image data in the pixel column direction, the controller extracts the document region from the read image data at the retrieved edge candidate position.

9. An image reading system including the image reading device according to claim 1 and a control device, wherein
the image reading device further includes a transmission section that transmits output image data corresponding to the document region extracted from the read image data and the dirt position to the control device, and
the control device includes
a reception section configured to receive the output image data and the dirt position, and
an image processor configured to reduce a line extending in the relative movement direction in the output image data based on the dirt position.

10. A control device coupled to an image reading device that relatively moves a document and a reading section reading the document in a relative movement direction and that transmits, to the control device, output image data based on a result of the reading performed on the document and a dirt position of the reading section in a pixel column direction intersecting with the relative movement direction, the control device comprising:
a reception section configured to receive the output image data and the dirt position; and
an image processor configured to reduce a line extending in the relative movement direction in the output image data based on the dirt position.

11. A document region extraction method employed in an image reading device including a reading section configured to read a document and output a result of the reading performed on the document, a driving section configured to relatively move the document and the reading section in a relative movement direction, and a storage section configured to store read image data based on the reading result and analysis image data that is based on the reading result and that is used to discriminate a document region from a background region out of the document region, the document region extraction method comprising:
a dirt detection step of detecting a dirt position of the reading section in a pixel column direction that intersects with the relative movement direction; and
an extraction step of extracting the document region from the read image data based on the analysis image data, wherein
in the extraction step,
the analysis image data is searched for an edge candidate position where the background region changes to the document region inward from an edge portion in the pixel column direction,
the search is continued when the retrieved edge candidate position corresponds to the dirt position, and
the document region is extracted from the read image data at the retrieved edge candidate position when the retrieved edge candidate position does not correspond to the dirt position.

* * * * *